US006711461B2

(12) United States Patent
Flores

(10) Patent No.: US 6,711,461 B2
(45) Date of Patent: Mar. 23, 2004

(54) OBJECT AND METHOD FOR ACCESSING OF ARTICLES FOR RELIABLE KNOWLEDGE OF ARTICLE POSITIONS

(75) Inventor: Juan E. Flores, Owasso, OK (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/907,919

(22) Filed: Jul. 19, 2001

(65) Prior Publication Data

US 2002/0175049 A1 Nov. 28, 2002

Related U.S. Application Data

(60) Provisional application No. 60/276,925, filed on Mar. 20, 2001.

(51) Int. Cl.[7] .................................................. G06F 7/00

(52) U.S. Cl. ........................ 700/223; 700/115; 700/224; 700/229; 198/349; 198/502.3

(58) Field of Search ......................... 198/349.8, 349.95, 198/502.3, 349; 700/115, 229, 223, 224

(56) References Cited

U.S. PATENT DOCUMENTS 3,272,353 A 9/1966 Wilder
3,743,090 A 7/1973 Brown et al.
3,785,510 A 1/1974 Grooteboer
4,891,568 A 1/1990 Shibata et al.
5,186,308 A * 2/1993 Munro ....................... 198/572
5,220,511 A * 6/1993 Speckhart et al. ..... 198/349.95
5,228,558 A * 7/1993 Hall ........................... 198/784
5,285,887 A * 2/1994 Hall ........................ 198/460.1
5,335,777 A 8/1994 Murphy et al.
5,862,907 A * 1/1999 Taylor ................... 198/781.05
5,887,073 A * 3/1999 Fazzari et al. .............. 382/110
6,014,628 A 1/2000 Kovarik, Jr.
6,021,888 A * 2/2000 Itoh et al. ................... 198/783
6,074,081 A * 6/2000 Smith et al. ................ 700/223
6,078,678 A 6/2000 Gavrilos
6,085,892 A 7/2000 Lem et al.
6,272,437 B1 * 8/2001 Woods et al. ................. 702/35
6,308,110 B1 * 10/2001 Fromherz ................... 700/228
6,325,198 B1 * 12/2001 Pattantyus-Abraham et al. 198/339.1

FOREIGN PATENT DOCUMENTS

EP 0 255 353 7/1986

* cited by examiner

*Primary Examiner*—Khoi H. Tran
(74) *Attorney, Agent, or Firm*—Whitham, Curtis & Christofferson, P.C.

(57) ABSTRACT

An apparatus such as a large scale sorter with peripheral devices associated therewith and including a transport path has sensors arranged along portions of the path and software objects respectively associated with each sensor and with each other in a tracking chain. Length measurement of articles is provided to confirm article identification and each software object, referred to as a softcell, is of a selectable type in accordance with the type of sensor event it can report and a mode controlling conditions under which selected types of events will be reported. Providing software objects for tracking allows hardware independence and ease of design and modification, particularly in the field by creation of softcells from a generalized architecture through a graphical user interface.

27 Claims, 19 Drawing Sheets

G_aw2MESSAGE_HEAP STRUCTURE

| | | |
|---|---|---|
| G_aw2MESSAGE_HEAP(X)(1) | QUEUE FORWARD LINK (FLINK) | |
| G_aw2MESSAGE_HEAP(X)(2) | QUEUE BACKWARD LINK (BLINK) | |
| G_aw2MESSAGE_HEAP(X)(3) | ARTICLE ID FOR THIS MESSAGE | |
| G_aw2MESSAGE_HEAP(X)(4) | SOFTCELL ACCUMULATED TIME FIELD | |
| G_aw2MESSAGE_HEAP(X)(5) | EVENT STATUS CURRENT STATUS | |
| G_aw2MESSAGE_HEAP(X)(6) | FIRST BAD STATUS (ANDED WITH OUTPUT (QUEUE AND 0xFF)<<8) | |
| G_aw2MESSAGE_HEAP(X)(7) | MY NEIGHBOR'S SOFTCELL | |
| G_aw2MESSAGE_HEAP(X)(8) | PREDICTED ARTICLE LENGTH IN MILLISECONDS | |
| | | |
| ADDITIONS FOR GATE CONTROL: | | |
| | | |
| G_aw2MESSAGE_HEAP(X)(9) | FIRST BAD STATUS OUTPUT QUEUE | |
| G_aw2MESSAGE_HEAP(X)(10) | DESTINATION BIN | |
| G_aw2MESSAGE_HEAP(X)(11) | ALTERNATE BIN (OR PROGRAMMED REJECT BIN) | |
| G_aw2MESSAGE_HEAP(X)(12) | ACTUAL BIN (WHERE IT ACTUALLY ENDED UP) | BIT 15 = 0 INHIBIT SELF CALIBRATE (SEE SELF CALIB NOTE BELOW) |
| G_aw2MESSAGE_HEAP(X)(13) | LEAD GAP SIZE (OR ERROR GAP IN STATUS) | (SEE STATUS FOR LEAD OR TRAIL) |
| G_aw2MESSAGE_HEAP(X)(14) | GATE AND CONFIRMATION STATUS: | (NONZERO = REJECT OR ALTERNATE) |
| | BIT 00: WRONG GATE | 1 = ARTICLE ENTERED WRONG BIN OR LOST |
| | BIT 01: DESTINATION GATE | 1 = DESTINATION GATE NOT ACTUATED |
| | BIT 02: ALTERNATIVE GATE | 1 = ALTERNATE GATE ACTUATED |
| | BIT 03: DEVIATION | 1 = MISSED DEADLINE |
| | BIT 04: CONFIRMATION | 1 = ARTICLE NOT DETECTED IN BIN |
| | BIT 05: BIN STATUS | 1 = BIN FULL DETECTED AT DESTINATION |
| | BIT 06: ALTERNATE STATUS | 1 = BIN FULL DETECTED AT ALTERNATE |
| | BIT 07: LEAD GAP | 1 = LEAD GAP TOO SMALL, REJECTED |
| | BIT 08: TRAIL GAP | 1 = TRAIL GAP TOO SMALL, REJECTED |
| | BIT 09: ARTICLE LOST | 1 = ARTICLE LOST AT (ACTUAL BIN) |
| | BIT 10 THROUGH BIT 15: | RESERVED FOR FUTURE USE |
| G_aw2MESSAGE_HEAP(X)(13) | RESERVED | |
| G_aw2MESSAGE_HEAP(X)(14) | RESERVED | |

*FIG. 11*

OBJECT AND METHOD FOR ACCESSING OF ARTICLES FOR RELIABLE KNOWLEDGE OF ARTICLE POSITIONS

NON-PROVISIONAL APPLICATION

This application claims priority to U.S. Provisional Application No. 60/276,925, filed Mar. 20, 2001, the entire contents of which are hereby incorporated by reference herein.

BACKGROUND OF THE INVENTION

1. Field of the Invention

The present invention generally relates to systems for transporting and sorting articles and, more particularly, to arrangements for tracking of articles in such systems and having an architecture readily adaptable in accordance with various configurations of such systems and modifications thereto.

2. Description of the Prior Art

Many manufacturing and service industries rely on the ability to transport and sort materials and articles. For example, in manufacturing and numerous other applications, objects must often be transported with substantial positional precision for various operations such as container filling, labeling, part installation, packaging and sorting by customer or order destination.

One current and particularly demanding application is that of mail or package sorting for large numbers of intermediate or final destinations or the processing of financial documents such as personal checks, where both the number of articles and the number of potential categories into which the articles must be sorted are very large and accounting for each article handled is of very high importance, particularly when any sorting machines may be subject to some types of article handling errors.

While the principal function of machines adapted to such an application is principally sorting and transport is largely incidental, the locations receiving each sorted category of article (e.g. each intermediate or final destination) must be of substantial size to receive the articles and the machines must generally be very large and the transport path must be very long to accommodate the number of receiving stations corresponding to the respective sort categories.

Also, to accommodate large volumes of articles, often reaching input rates of sixty thousand articles per hour, transport speeds must be very high. Therefore, apparatus such as optical character recognition, bar code readers and the like must function accurately at very high speed to achieve the desired sorting at article velocities reaching two hundred inches (about seventeen feet) per second or more. To achieve accurate and precise handling and tracking of individual articles during the sort process, the position of articles must be accurately known while the high article speed generally prevents use of provisions which could maintain the position of an article relative to the transport arrangement. For example, pinch belt mechanisms provide for the belts to be driven at slightly different speed to avoid overlapping of flat articles but, by the same token, rely on a degree of slippage between articles and the belts. Therefore, extremely high performance is required from numerous optically-based sub-systems to support such sorting machines.

Photocells, switches and various sensors and arrays thereof are generally used to gather data for real-time control of such sorting machines and provide identification of individual articles and the instantaneous position on the transport is of paramount importance. However, any such sensors are susceptible to developing signals by detection of non-article related events such as ringing or bouncing upon change of state. In a sorter, it is necessary to know when to read indicia and to know the position and precise identification of the article in order to scan its data, read its text, print data on it, apply labels to it, stamp it, make a microfilm exposure and the like as well as when to divert the article to a bin or other receiving station, particularly as an incident of reducing effects of sensor noise. That is, if the operation of sensors can be suitably limited to the period of time in which an event of interest will occur, the amount of noise and false data signals can, in theory, be substantially reduced and accuracy of article handling and reliability of sorting be improved.

Unfortunately, two major problems militate against realization of such an improvement. First, the necessary characteristics of the article conveyor can cause the article to lose registration with a location on the conveyor which may have been detected at a given point in time. Such physical factors include variability of motion of the article along the conveyor, varying physical characteristics of the articles (and their respective aerodynamics, dimensions, thickness, rigidity and the like), varying sizes of gaps between articles, overlapping of flat articles and the loss of articles from the conveyor. Therefore, there is a limit on the degree to which acceptance of signals from sensors can be limited and noise reduced without compromising the collection of good information and the confidence which may be accorded data which is collected.

Second, any inaccuracy or detected change in tracking (e.g. detection of a given article at a sequence of locations over time in a machine which is necessarily subject to spurious events, jamming, articles of unanticipated dimensions, lost or unexpected articles, change of length of articles and the like) of a given article may raise uncertainty as to article identification and cause large errors in sorting accuracy while sensor noise may engender errors as to article location and engender ambiguity in error reporting and incorrect error recovery. Loss of an article from the conveyor or common handling of overlapping or inadequately spaced articles which should be differently sorted after the sort identification is made could result in a large volume of articles being misdirected during the sort. Different types of errors may not be adequately distinguishable or even detectable. That is, errors may not be reliably detectable and, when errors are detected, the diagnostic capability is limited to high-level distinctions between error characteristics, limiting any diagnostic or error reporting, logging and recovery capability that may be employed in regard to detected errors.

Additionally, as a practical matter, object detection with sensors in accordance with fixed locations on conveyor apparatus necessarily involves substantial hardware dependencies. That is, at any given point in time, a given photocell will correspond to a given location on the conveyor apparatus and that location on the conveyor apparatus will correspond to another photocell or other structure (such as a sorting station and bin or other synchronized peripheral device such as a printer or display) at another point in time. Therefore, the software controlling the sorting machine must be customized to each particular installation since large-scale sorters will generally be tailored or specialized to particular applications. Moreover, systems must be calibrated by the software for given operating conditions that may, in fact, vary over time.

By the same token, an additional practical problem with large-scale sorting machines is that increasing volume and numbers of sort categories also requires increase of size or other modifications of many such machines from time-to-time to provide adequate efficiency in other parts of the delivery process, such as expansion or restructuring of carrier delivery routes and the like. Thus, any modification, either structurally or operationally, requires development and custom installation of specially adapted software corresponding to both the sorter hardware configuration and its mode(s) of operation. Thus, the software development and maintenance results in substantial increases in initial and ongoing costs on different and disparate machines, slows time to delivery of new machines and increases the difficulty, time and cost of in-field changes to existing machines.

Concomitantly, current large-scale sorting systems lack fully integrated software tools to facilitate new system configuration, calibration, modification, maintenance and management. Such activities may entail time-consuming and costly software and hardware modifications.

SUMMARY OF THE INVENTION

It is therefore an object of the present invention to provide accurate and precise tracking of every article presented to an article handling machine together with full accounting and auditing with full error reporting and logging for error recovery.

It is another object of the invention to provide a hardware-independent article tracking system suitable for integration with a sorting apparatus or system and to provide a tailorable software object to encompass plural modes of operation to accommodate many variations of system configuration and modification.

It is yet another object of the present invention to provide a reduction in software development and installation time and cost for disparate or different sorter machines and modifications thereof.

It is a further object of the invention to provide increased accuracy of article tracking and error reporting and low-level embedded diagnostics and error recovery in an article transporting and/or sorting system.

It is another further object of the invention to provide a self-calibrating article tracking system which is adaptive to changing operating conditions.

It is another object of the invention to provide a system for controlling an article transport and/or sorting apparatus controllable by generalized software which can simply and easily be configured to a specific installation using a graphic user interface.

It is a yet further object of the invention to provide graphical user interfaces (GUIs) to facilitate configuration, calibration, modification, maintenance and management of an article tracking system.

In order to accomplish these and other objects of the invention, a software object is provided including an input for receiving digital information from a sensor, a data input for connecting it to other like objects, and an arrangement for selectively reporting conditions corresponding to the digital information based on signals derived from the data input. These software objects can be used singly or to form a tracking chain or chains and, in either case, provide high accuracy of article identification and position tracking in transport mechanisms such as those associated with large scale sorters. The expected time of an article related event is predicted based on an adaptive fuzzy bracket which is self-calibrating and can shift or change in size, depending on whether a particular event or an accumulated average of events is earlier or later than expected. This software object will be referred to herein as a softcell.

BRIEF DESCRIPTION OF THE DRAWINGS

The foregoing and other objects, aspects and advantages will be better understood from the following detailed description of a preferred embodiment of the invention with reference to the drawings, in which:

FIG. 11 is a chart showing a preferred message structure in accordance with the invention.

DETAILED DESCRIPTION OF A PREFERRED EMBODIMENT OF THE INVENTION

Figure 1A:
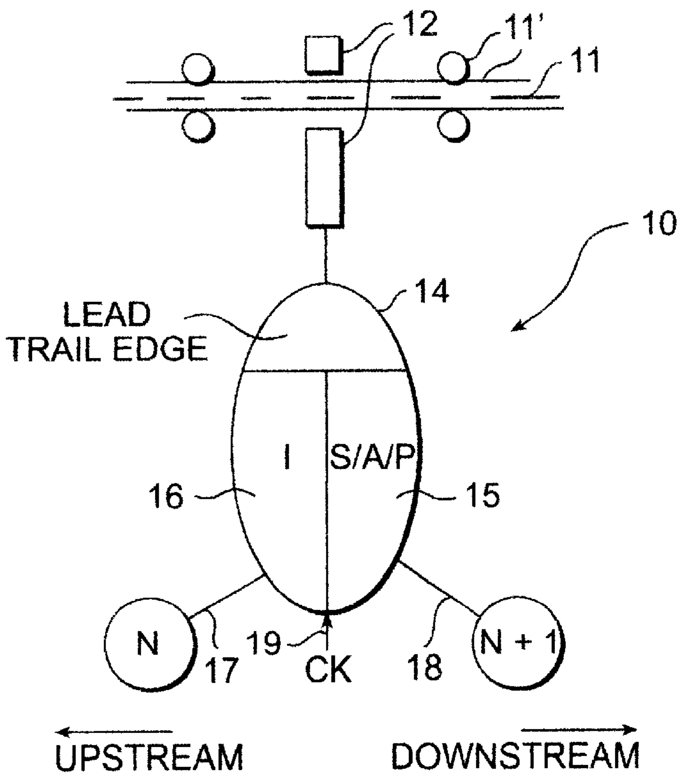
FIGS. 1A and 1B are diagrams useful in understanding the concept of a softcell in accordance with the invention.

Referring now to the drawings, and more particularly to FIG. 1A, there is shown a diagram representing a softcell software object, or more simply a softcell. It will be understood by those skilled in the art that the term "object" is used in the sense of object-oriented programming, a conceptual approach to software development in a modular fashion in which a module is an object that can be called and run to perform a particular function by other objects. Depending on the particular form of analysis or description of an object, it may be considered to have attributes and relationships or properties and dependencies. It is possible, depending on the data processing resources available for the software of many objects to be autonomously run concurrently (or simultaneously) and thus many such objects of similar or distinctly different nature can concurrently exist and concurrently execute.

The invention is readily applicable to any article or document (e.g. negotiable instruments) handling system such as for handling and sorting of letters, flats, packages or tray handlers, parcel bundle systems, article delivery systems, conveyors and the like. In accordance with an exemplary implementation of the invention, softcell objects may be used to populate the length of a transport mechanism of a sorter apparatus with each softcell corresponding to a particular portion thereof of arbitrary length. A softcell is associated with and receives an input from a single photocell (or any other type of sensor such as a mechanical, acoustic, capacitive, or inductive proximity sensor capable of producing different, preferably digital, outputs depending on the presence or absence of an object or condition of interest), but an arbitrary number of softcells can be associated with a given sensor to provide a variety of functions, as will be discussed in greater detail below, and to accommodate different topologies and geometries of the transport path through the sorter.

Before further describing a softcell, it will be useful to review some of the movement variations which commonly occur in large scale sorters and system requirements for satisfying the above-noted objects of the invention. To accommodate the manufacturing, field modification and service goals of the above-noted objects, the software system must be completely hardware independent. This is achieved by providing sensor input through simple inputs and outputs (I/O) and by providing standard software communications between softcells that are descriptive only of hardware events that are detected or are subject to certain failure modes. The articles that are transported by the machine should normally be kept in mechanical order so that their order reflects identification or destination/sort category previously determined. It is preferable that the sorter in accordance with the invention be capable of supporting high volume operation in excess of sixty thousand articles per hour and transport speeds of several hundred inches per second while updating tracking preferably every millisecond. Peripheral devices such as data readers, printers, cancellers, label applicators, magnetic ink detectors, microfilmers, thickness, width, length and texture detectors, status displays and the like must also be accommodated. The physical nature of movement of articles is such that the machine cannot control articles 100% of the time. The goal then is to gain 100% knowledge of the final destination of each article, regardless of success or failure.

Error detection and reporting/diagnostic matters which are accommodated by the invention and which are important to meet a goal of complete knowledge of every article are generally involved with inconsistencies between observations by softcells which may affect order and identification of articles that may compromise the sorting operation. Such errors, for example, include leading or trailing gap between articles of insufficient size, multiple feed, article collision (such that two or more articles are commonly sensed as a single article, the appearance of an unexpected article (which can occur from an article being unexpectedly added to the transport at a location along its length), an article lost from the transport (which can occur due to article aerodynamics, loose grip or other effects at high transport speed), an article jammed at a particular location (where many articles can be quickly destroyed if sorter operation is not quickly interrupted or corrected), length change (which can occur through unfolding of an article or reflect separating overlapped articles as well as a possible change in article order) and bin errors at the final sort locations such as a bin gate not opening in time or allowing a tail-gated article into a bin.

The function of a softcell 10 is to receive messages from an upstream module (e.g. a control unit or softcell), detect an event and forward a message concerning the detected event to a downstream softcell. Since information in messages is limited to events related to articles, the invention is independent of the type of transport mechanism and data processing elements employed. (Softcells in accordance with the invention also lend themselves to distributed computing environments, further facilitating modification and, particularly, extensions of existing systems.) Since softcells are associated with portions of the transport path and may only communicate with immediately adjacent softcells or control units, the invention is independent of the topology and geometry of the transport arrangement.

For purposes of illustration of an event in the preferred environment of a mail (e.g. letters or flats) sorter, sorting path 11 is defined by pinch belts 11'. Generalized sensor 12 is illustrated as having components on each side of an article path as would be the case for a preferred form of photocell sensor including its own radiation source of a radiation path that can be either blocked or unblocked by the respective presence or absence of an article of interest. Reflective sensors on the same side of the article are also often used.

To carry out the above-described function, the softcell preferably has the attributes or properties of a particular type of event it is to observe and report (in this case, a sensor digital input corresponding to a sensor device indicating the presence or absence of an article; a leading or trailing edge event is a transition from article absence to article presence or vice-versa, respectively, which can be assigned as an attribute or type of the softcell) 14, a mode of operation (in this case synchronous, asynchronous or predictive mode, between which it preferably can be switched during standard operations) 15, an identity 16 (preferably in the form of a number, I), an input queue 17, an output queue 18 and a clock input 19, preferably in the form of a shared time slice or a position encoder address (which will be collectively referred to hereinafter as a time stamp). For the preferred environment of the invention, these properties or attributes are chosen to provide maximal generality with limited data transfer and control for rapid execution of softcell functions. Of course, other properties and attributes may provide such qualities in other environments as will be apparent to those skilled in the art in view of this discussion.

In addition, as perfecting features of a softcell in accordance with the invention, leading and trailing edge debouncing techniques may be selectable or adjustable and input and output queue pointers are preferred input and output arrangements for generality and accommodation of certain path configurations such as crossings and merging and/or diverging paths and facilitating certain operational functions which will be discussed below. It is also preferred for generality to provide for setting and adjustment on the mechanical early and late limits of the softcells to control response to system faults as a globally available option in any part or the entirety of the sorter system. Global operations provided in a softcell preferably include but are not limited to calibration regarding article length, detection of articles which are too long or too short and the length at which a jam condition is asserted.

In the synchronous mode of operation, the softcell makes a sensor observation only when an event message reported by the immediately upstream softcell is in the input queue of the softcell whereas in the asynchronous mode, all observed sensor events of the type to which the soft cell is assigned are reported. The predictive mode is similar to the synchronous mode with the addition of a time window to limit observation of events to the predicted time of arrival of an article. In general, most softcells are operated in the predictive mode unless special requirements of the transport require otherwise. For example, asynchronous mode is always used for the first softcell of the transport and synchronous mode is preferably used where transport speed changes dramatically. The term "event mode(s)" may be used to refer to these (or other) operational modes generally or collectively.

In the preferred environment of a sorter, it is also assumed that an identity data structure (or message) will have been initially established for each article as it enters the transport path. These messages carry a unique identifier for each article and allow for data to be added by peripheral devices along the transport path. It is to be recalled that a softcell is associated with a given sensor at a given section of the path length of the transport arrangement. Therefore, the use of input and output queues establishes a tracking chain along the transport path for softcell data input and output and is preferred as a relatively simple mechanism for maintaining the order and tracking of individual articles while providing flexibility in maintaining certainty of identification of individual articles and error detection and recovery. In general, it is preferred that sensors be placed at intervals exceeding the maximum length of articles to be tracked but softcells can accommodate virtually any arrangement.

Figure 1B:
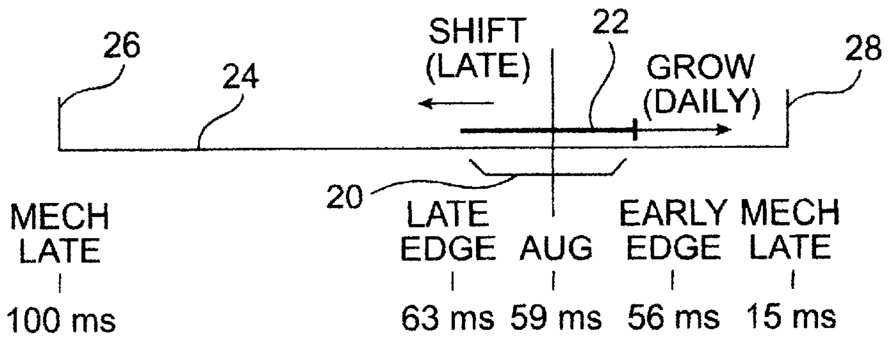

Softcell 10 also preferably has the capability of self-calibration in several modes which will now be explained with reference to FIG. 1B. Preferred self-calibration modes are fast self-calibration which uses each article for self calibration (and which avoids a need for individual manual calibration of each softcell as it is established) and continuous self-calibration which operates similarly on averages over an arbitrary number (e.g. a few to tens of thousands) of event times. In essence, a softcell functions much in the nature of an expert system in regard to the part of the transport system corresponding to it. Ideally, articles being transported and sorted will appear individually and separated by some gap along the transport arrangement and will be detected at various locations along it in a typically consistent order.

The gap is not a variable or parameter of the softcell and a minimum gap is a function of the article feeding system. The feeding system is chosen by the system designer to provide needed article throughput, but it must also provide minimum gaps to allow time for physical and program latencies. As long as this condition is maintained, the order of arrival should normally carry the same information as the article identification. Therefore, variations in motion and spurious events along the transport system that could affect certainty of identity must be discriminated. When an event is detected in connection with movement of an article at any given softcell and a message sent to the immediately downstream softcell, the downstream softcell can predict when the article event should happen.

This prediction is based not only on the intended, design transport speed of a particular section of the transport arrangement, but can adaptively track the actual performance of the section of the transport arrangement corresponding to the softcell. For example, depending on photocell spacing (which can be arbitrary) a set of similar length articles causing a reportable event at a given sensor of a softcell will ideally reach the sensor of the immediately downstream softcell an average time, for example, of 59 milliseconds later as shown in FIG. 1B with some variance (e.g. 3 milliseconds) depicted by bracket 20. These conditions can be reflected in an initial calibration of the softcell. The most likely causes of change in this parameter would be faster or slower belt sections, loose belts, loose bearings or drag on the mechanism of the transport arrangement slowing motion of the corresponding section of the transport arrangement.

Therefore, it is desirable to provide a fast self-calibration (or, more simply, fast calibration) mode to allow a relatively few articles of uniform length and representative of articles to be sorted (including physical characteristics such as weight, thickness, slickness and the like) to provide working self-calibration parameters of the soft cell. This calibration, in accordance with the invention is preferably implemented by a set of timings that correspond to the particular physical conditions of the particular transport section as observed by a softcell and referred to as a fuzzy (i.e., variable and self-adjusting) bracket depicted by bar 22 in FIG. 1B. If the predicted event occurs early by more than some selectable time (e.g. 3 milliseconds) or the time variance indicated at any given time by fuzzy bracket 22 (but within mechanical limits depicted by bar 24 and set in accordance with conditions corresponding to an error, as will be discussed below) due to physical drag or the like, fuzzy bracket 22 is shifted to the right (as depicted) by a selectable time duration (e.g. 1 millisecond) for each early occurrence, preferably without regard to the actual time by which the event is early. If an event is late, it is preferable that the fuzzy bracket is enlarged by a given time duration (e.g. 1 millisecond at both ends to increase timing tolerance). Since the extent of mechanical limits 24 is relatively limited, it can be seen that the fuzzy bracket will rapidly develop a time location and size that will statistically represent the average and variance of events following an immediately upstream prior event representative of acceptable and correct operation. Thus, the fuzzy bracket defines a predicted temporal range for the occurrence of an event.

While the shift of the fuzzy bracket for early events and growth of the fuzzy bracket for late events is preferred due to the relative likelihood of conditions that would cause late or early events, the converse of these rules (e.g. shift for late events and growth for early events) could be used and may be preferable for some mechanical arrangements. In either case, an uncalibrated initial state is preferably set with the early and late values of the fuzzy bracket at either the early or late mechanical limit depending on whether late or early events are to cause shift of the fuzzy bracket. A need for reduction in size of the fuzzy bracket has not yet been observed but can be accommodated by the softcell as described herein. Other rules could also be applied in accordance with various thresholds and the like. However, the ability to manipulate both the temporal location and extent of a fuzzy bracket is considered important (but not necessarily essential) to the practice of the invention to realize its meritorious effects to the fullest possible extent.

An additional mode of self-calibration is also provided and referred to, for purposes of distinction from fast calibration, as continuous self-calibration (or, more simply, continuous calibration). This calibration mode is similar to that described above except that control is exercised on the basis of the average of an arbitrary and potentially large number of event times and over relatively large amounts of time. The fuzzy bracket is shifted in position or size with the same, converse or other rules discussed above as the current average approaches the limits of the fuzzy bracket 22.

In both of these calibration modes it is desirable to constrain the limits of the fuzzy brackets suitably within and without reaching the mechanical limits 26, 28 in order to avoid ambiguity in error detection reporting and recovery as will be further discussed below. It should be understood that either or both of the calibration modes described above can be implemented or not as global or local options, as desired, possibly to accommodate greater or lesser criticality of article movement in various sections of the transport arrangement.

It should be appreciated that the above functions of a softcell and others which will be described below can be supported by messages passed from data output queues to data input queues (or other arrangements) between softcells that are very limited in content and thus capable of being processed quickly. Specifically, a very limited number of status codes, together with an event time, are sufficient to support the desired functioning of a plurality of softcells to achieve the above-noted objects in a large scale sorter. In the interest of completeness, the preferred status codes are:

| Status Byte | |
|---|---|
| Bit | Description |
| 0 | Early lead |
| 1 | Late lead |
| 2 | Trail override |
| 4 | Queued message flushed |
| 8 | Length rejected |
| 16 | Article violated mechanical limits |
| 32 | Average violated mechanical limits |
| 64 | Bracket violated mechanical limits |

| Bit Combinations | Description |
|---|---|
| Status Bit Combinations in Hexadecimal Event Status | |
| 00 | OK (lead or trail) |
| 01 | Early lead |
| 02 | Late lead |
| 03 | Possible jam at lead cell |
| 04 | Trail OK |
| 05 | Early trail |
| 06 | Late trail |
| 07 | Possible jam at trail cell |
| 08 | Jam at trail cell |
| Status Bit Combinations in Hexadecimal Article Limit Violations (720 of FIG. 7) | |
| 20 | OK (lead or trail) |
| 21 | Early lead |
| 22 | Late lead |
| 23 | Possible jam at lead cell |
| 25 | Trail OK |
| 26 | Early trail |
| 27 | Late trail |
| 28 | Possible jam at trail cell |
| Status Bit Combinations in Hexadecimal Length Reject (780 of FIG. 7) | |
| 31 | Length too short |
| 32 | Length too long |
| 35 | Length too short |
| 36 | Length too long |
| Status Bit Combinations in Hexadecimal Bracket Average Mechanical Limit Violations (760 of FIG. 7) | |
| 41 | Average early limit lead cell |
| 42 | Late limit lead cell |

-continued

| Status Bit Combinations in Hexadecimal Bracket Position and Size Limit Violations (789 of FIG. 7) | |
|---|---|
| 81 | Mechanical limit early lead |
| 82 | Mechanical limit late lead |
| 85 | Early trail |
| 86 | Late trail |

Thus, as described above, it is seen that softcells are easily capable of tracking the performance of corresponding portions of a transport arrangement of arbitrary design in nominally proper or acceptable operation. The softcells are adaptive and self-calibrating in accordance with the movement of articles by an arbitrary section of the transport arrangement of arbitrary design.

Therefore, softcells constituted as described above are capable of confirming proper operation and tracking of objects and support proper sorting in accordance with identification, destination or sort category of the articles which is otherwise determined. It should be appreciated, in this regard, that softcells can adaptively and precisely control the triggering or the activation period of various peripheral devices such as optical character recognition (OCR) devices, and the like, as alluded to above, to be synchronized with article movement for improved performance. However, other preferred features of softcells provide enhanced error detection and diagnostics as will now be discussed.

First, the messages in the input queue of any given softcell will have a latency between the time the message is communicated from an output queue of an upstream softcell and the occurrence of the event it causes the softcell to expect. This latency is monitored in accordance with the invention, preferably by aging of the message in the queue. That is, a time stamp or transport location signal is attached to the message, set to an initial value (e.g. zero) and incremented during the latency in the queue or, alternatively, a difference computed between an original time stamp and a current time stamp. If the age of a message exceeds the late bracket limit 26, the message may be passed on to the next softcell with a late status since it may indicate the corresponding article did not arrive at its predicted time.

Messages are typically not deleted until they have passed through the full tracking chain and been audited and reconciled. The status of each softcell in regard to each article is passed on to the next softcell regardless of good or bad status. Alternatively, the softcell could be configured to pass flushed messages to a flush queue, effectively making a shortcut to the auditing control unit.

An age beyond a mechanical limit 26 is a length or time at which a jam condition is asserted. Thus, the mechanical limits define an acceptable temporal range, which directly corresponds with the acceptable physical range, for the occurrence of an event. (The limits of the fuzzy bracket are managed completely independently of the mechanical limits of the timing bracket and in theory, an average message time/age can exceed a mechanical limit.) A loss of a single article from the transport arrangement without jamming need not interrupt operation of the sorter and the association between order and identification of articles may be restored in accordance with the status of a message.

Second, the length of respective articles may be measured by combinations of softcells to further confirm identity of articles and/or enhance diagnostic discrimination. However, measurement of articles with sufficient accuracy for such purposes in the preferred environment of the present invention presents significant technical challenges. Further, to enhance a tracking system, the measurement system must be integrated therewith. Both of these concerns are advantageously addressed by softcells as will now be explained.

It will be recognized that the above-described tracking functions and error detection can be performed based on sensing of either leading edge or trailing edge events and, in general, information derived from either type of event is equally effective for the purpose. However, in some cases, either leading edge or trailing edge information may be preferable to the other. For example, mechanisms which physically redirect the path of an article must be set up into a particular state or configuration prior to the arrival of a leading edge of an article. On the other hand, it is often desirable that triggering of operation of various peripheral devices, as alluded to above, occur after an article has passed a given point. Therefore, it may be desirable to track leading edge events in some regions of the sorter and to track trailing edge events in others. Generally, for system simplicity, a sequence of leading edge event softcells will be continued until trailing edge information is needed and vice-versa.

To measure an article of arbitrary length, both a leading edge event and a trailing edge event must be observed for the same article on the same sensor. Therefore, any transition between a pair of softcells of leading edge and trailing edge types is capable of making a length measurement and, for convenience and optimum identification confirmation, the first such transition is used to make such a measurement and the pair of softcells corresponding to the transition is referred to herein as a length-master. Other, later transitions can, of course, be used in the same way (and will be so used automatically if invalid length forward information is received) but may diminish the number of confirming length measurements that can be made in the remainder of the sorting path. A pair of softcells of differing event type can also be provided wherever a measurement is desired along the transport path to confirm article dynamic length changes or discriminating an article which is too long or too short and, in such a case, either or both such softcells need not be in the tracking chain. Even though softcells do not measure gap, gap measurement may be achieved by using a trailing edge softcell followed by a leading edged softcell on the same sensor in conjunction with a gap measurement control unit (e.g., a timer). The knowledge of gapping allows the system to make decisions based on gap (e.g., reject because a gap is too small).

The softcells of the length-master are calibrated, as discussed above to a standard length of, for example, nine and one-half inches (a standard mail dimension) corresponding to a time difference depending on transport speed (e.g. 59 milliseconds at 160 inches per second). It is preferred to maintain length data as a time measurement throughout processing as a matter of precision since length is not the only factor in these time measurements and physical and program latencies are accounted for within the fuzzy brackets in these "length" measurements.

Accordingly, articles having a length greater or less than the calibration length will have a greater or lesser time separation between leading and trailing edges than the time separation for the calibration length. It should be appreciated that a transition between detection of leading edge events and trailing edge events will therefore require adjustment of predicted arrival time of the event of changed type by an amount corresponding to the article length. It should be understood that "length" in the context of the invention is defined as the dynamic physical time an article takes from event to event, considered in relation to transport speed.

Figure 2:
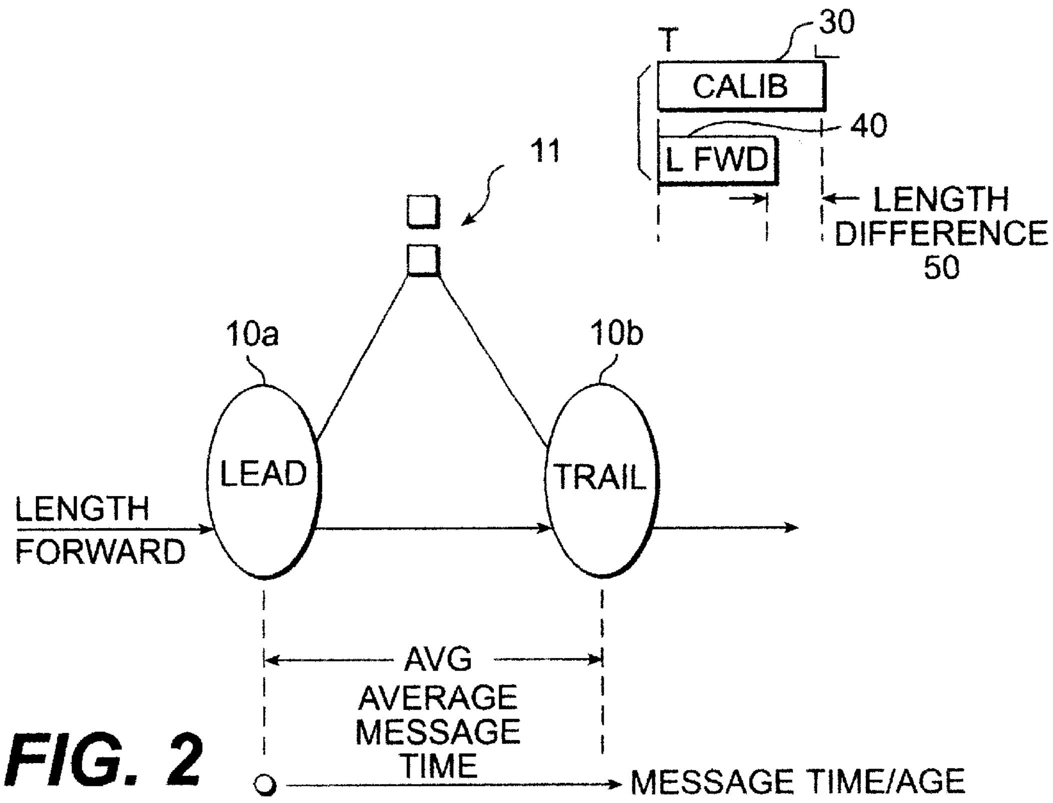
FIGS. 2 and 3 are diagrams illustrating the concept of length forward theory in connection with a softcell as implemented in accordance with the invention.
Figure 3:
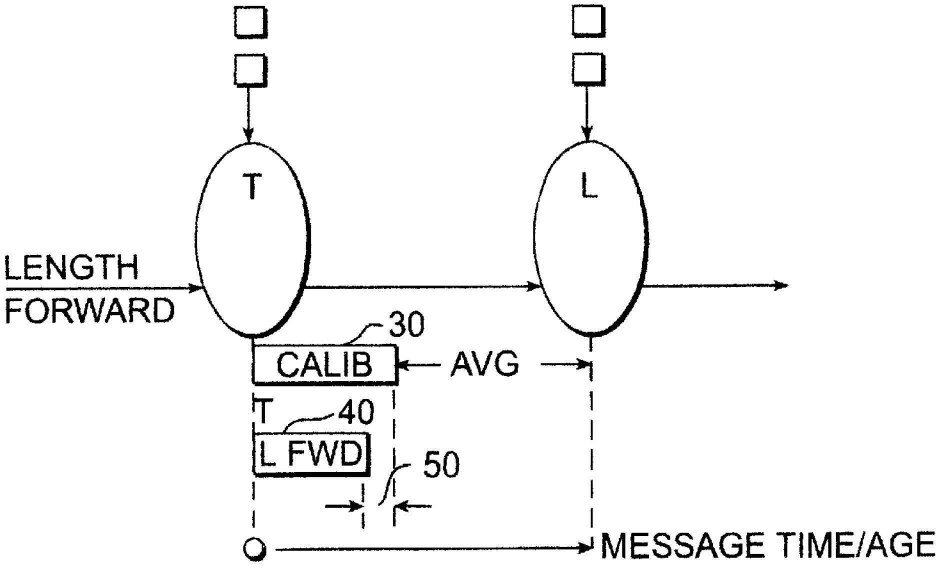

It is a substantial advantage of the present invention that this adjustment, performed in the manner which will now be described in connection with FIGS. 2 and 3 is also sufficient to effectively measure article length for purposes of identification confirmation and error diagnostics with accuracy as high as the resolution (e.g. millisecond) of the time base or position encoder in the conversion/adjustment process. It is a further meritorious effect of the present invention that the data processing and message communication time/latencies are also automatically accounted for and compensated in accordance with the preferred embodiment of the invention.

Referring to FIG. 2 a leading edge to trailing edge transition pair of softcells 10*a*, 10*b* is shown. (FIG. 3 shows the reverse transition.) These softcells can, but need not, receive inputs from the same sensor 11, as shown. It is assumed that a measurement of the article has been made by a length-master upstream from the softcell pair 10*a*, 10*b*. The length measurement is made relative to the uniform calibration article length 30 which is known globally throughout parts of the system relevant to this operation. The length measured by the length-master is referred to as the length forward and remains unchanged by other softcell processes and is passed to softcells 10*a*, 10*b* in turn.

When a leading edge event is observed by softcell 10*a*, the arrival time is checked against the fuzzy bracket 22 and the mechanical limits 26, 28 and a message is sent to softcell 10*b* as described above. However, in this case, the event predicted that softcell 10*b* is to observe is a trailing edge event at the same (or another) sensor location. Thus the self-calibration (collectively referring to fast calibration and continuous calibration) of softcell 10*b*, which is independent from the self-calibration of softcell 10*a*, will inherently tend to follow that of softcell 10*a* but differ in time or message age in the input queue of softcell 10*b* by the transit time of the calibration length. That is, the message age at softcell 10*b* will correspond or equate to article length.

Since the calibration length and transport speed (either actual or nominal) is known for both the length-master and the local softcell pair are known and the length forward measurement is provided to softcells 10*a*, 10*b* in turn. Either or both in combination can make a simple calculation of the length difference between the calibration length and the length forward.

From the resulting value, the predicted arrival time of the trailing edge can be made and implemented either as an adjustment in initial age of the message in the input queue of softcell 10*b* or, preferably, as an adjustment in the actual message age when the trailing edge event is detected. Either adjustment effectively places a non-limit violating event on the timing bracket of FIG. 1B without modification. Therefore, the same operating margins and error detection values reflected in the self-calibration as described above are applied at softcell 10*b* based on the length effectively measured by the softcell pair 10*a*, 10*b* and without calculation or significant other processing beyond that necessitated by the transition which is simplified by the softcell architecture in accordance with the invention. After adjustment, the new age value can be used as another point in the continuous calibration average.

It should be appreciated that use of the same timing bracket data structure definition used for leading or trailing edge event tracking provides not only simplification of processing and additional diagnostic discrimination (e.g. different errors can be detected at either or both of softcells 10*a* and 10*b*) but increased integrity of tracking over an increased range of arbitrary article lengths. This advantage of the invention can be understood from considering, for example, a range of permitted lengths varying by more than a factor of two.

That is, if the longest and shortest possible article lengths are to be accommodated by a change in mechanical limits 26, 28 of the timing bracket of a softcell and the lengths vary by more than a factor of two (and noting that an article longer than the calibration length will cause the trailing edge to always appear late and an article shorter than the calibration length will cause the trailing edge to always appear early), the timing bracket length without length forward adjustment may allow one of two short articles to pass unobserved. No such data can be lost or article transit unobserved in accordance with the length forward processing described above. Each varying article length is accounted for to the highest resolution accuracy of the system.

Referring now to FIG. 3, a transition from a trailing edge event softcell to a leading edge event softcell is illustrated. In this case, two sensors having a separation greater than the article too long length are required since the article's leading edge will have passed the first sensor and the second sensor when the trailing edge event at the first sensor for an article is detected. The processing/operation of FIG. 3 is similar to that of FIG. 2 except that variable article length now results in a variable gap between the downstream sensor and the leading edge of the article. Again, the length forward value is used to determine a length difference 50 which is then combined with the average time or age of a message to predict the leading edge arrival time that can be evaluated against an unmodified timing bracket, as before. Lead-trail and trail-lead queue relationships can be established if all articles will be of longer length than the distance between sensors. Lead-lead and trail—trail are not sensitive to any length other than the mechanical jam limit or the minimum physical gap size.

In view of the foregoing, it is seen that softcells constituted as described above provide improved tracking of individual identified articles in a manner which is completely hardware independent. Combined with identity confirmation by length measurement and correlation with expected lengths, complete information is provided regarding the location of any individual article at any point in time. Any detected error is correlated with a particular article and a particular location in the sorter while full diagnostics can be readily derived and a full range of peripheral devices supported with limited data transfer and processing. Details of a preferred embodiment of softcells and their operation in the environment of a high speed sorter will now be described with reference to FIGS. 4–8B. An exemplary application of the invention to a sorter environment showing development of additional operational and functional enhancements will then be discussed in connection with FIG. 9 and a modified form thereof is illustrated in FIG. 10.

Figure 4:
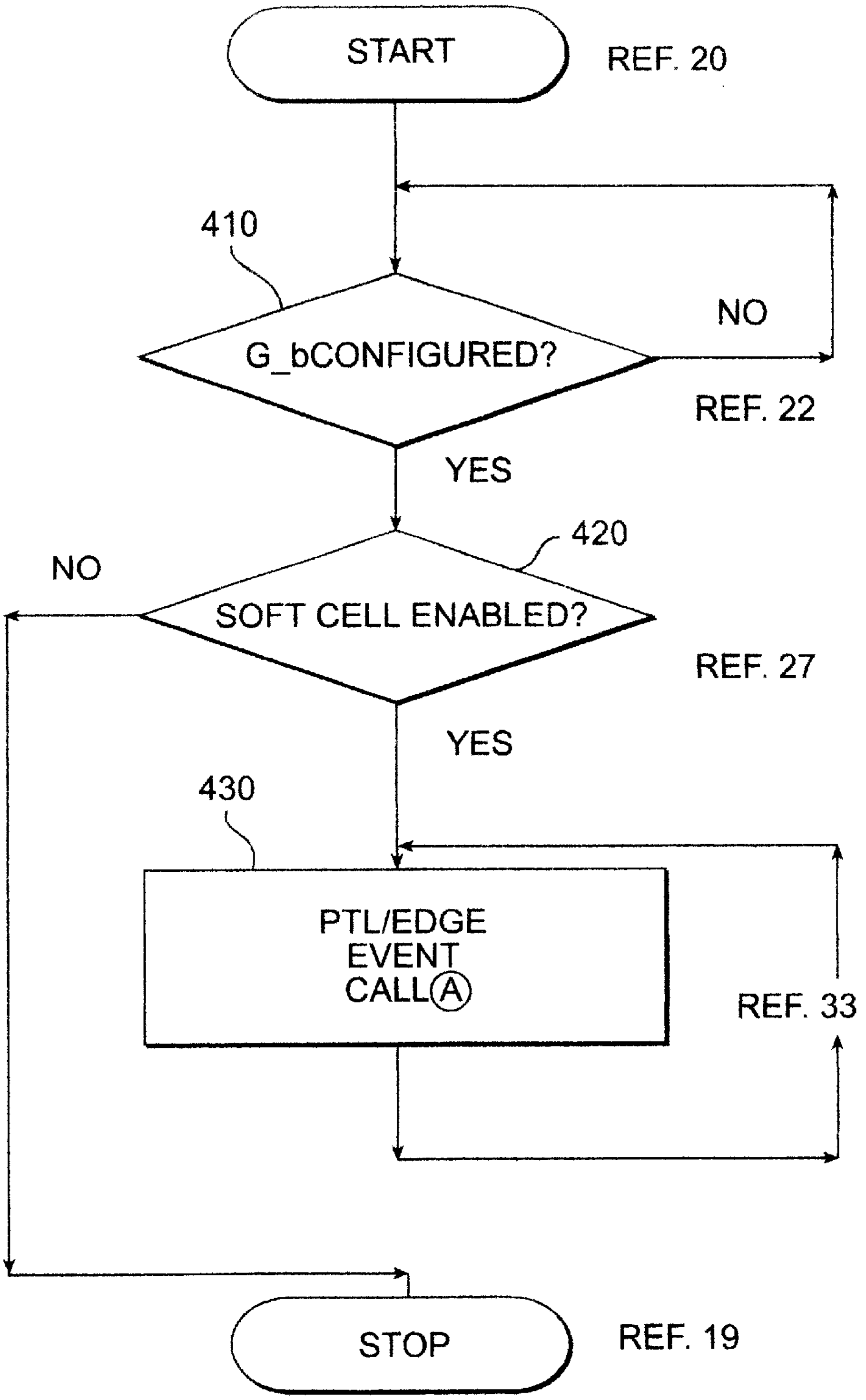
FIG. 4 is a flow chart depicting initial operation of the invention, FIGS. 5A and 5B form a flow chart illustrating self-calibration and discrimination of errors together with diagnostics for a leading edge event, FIGS. 5C and 5D form a flow chart illustrating self-calibration and discrimination of errors together with diagnostics for a trailing edge event.

Referring now to FIG. 4, an initialization procedure for softcells is shown. When the system is started, it is first determined whether or not the softcell has been configured at step 410 possibly including initial definition of the timing bracket and all other softcell parameters of FIG. 1B. In this regard, the mechanically late and mechanically early limits are of particular importance for detecting jamming of the apparatus or the unexpected appearance of an article which can confuse the sorting operation downstream, respectively. The mechanically early limit should accommodate tolerable and anticipated speed variations of the transport operations but must be set less than the minimum allowable piece length/article too short length and must be greater than or equal to the minimum possible physical time between sensors at normal transport speed tolerances. These limits and other parameters of the timing bracket can be set automatically at self-calibration step 790 which will be discussed below.

(Each transport section has an early limit at which anything below it is physically impossible under normal conditions and can be only achieved if mechanical breakdown of some sort occurs. Therefore, the early limit detects mechanical or bad calibration faults. In contrast, it should be appreciated that exceeding any late limit represents a physical possibility.)

Of course, the latter criterion is much more critical and the transport speed variation must be kept within limits such that transport speed increase above the average speed does not advance article position as much as the minimum article size without reporting a potential error. The mechanically late limit is preferably set to the greater of: the length at which a jam is asserted or, alternatively, slightly (an amount sometimes referred to as a "fuzz") greater than the transit time of the largest allowable article length, particularly if sensor are placed closer than the largest article length in order to avoid false detection of a jam, or the distance between sensors, converted to travel time or encoder ticks.

If the softcell has not been configured, the process loops through a suitable procedure, the details of which are not important to the practice of the invention, and retested at step 410. Once softcell configuration has been confirmed, it is determined whether or not the softcell is enabled at step 420. It should be appreciated that it may be desirable, depending on particular functions that may be desired in the sorting system at any given time, to provide the capacity for more softcells than are required and/or to selectively enable or disable particular softcells. If the softcell is enabled, a main softcell logic subroutine is called so that an edge event detection can begin.

Figure 5A:
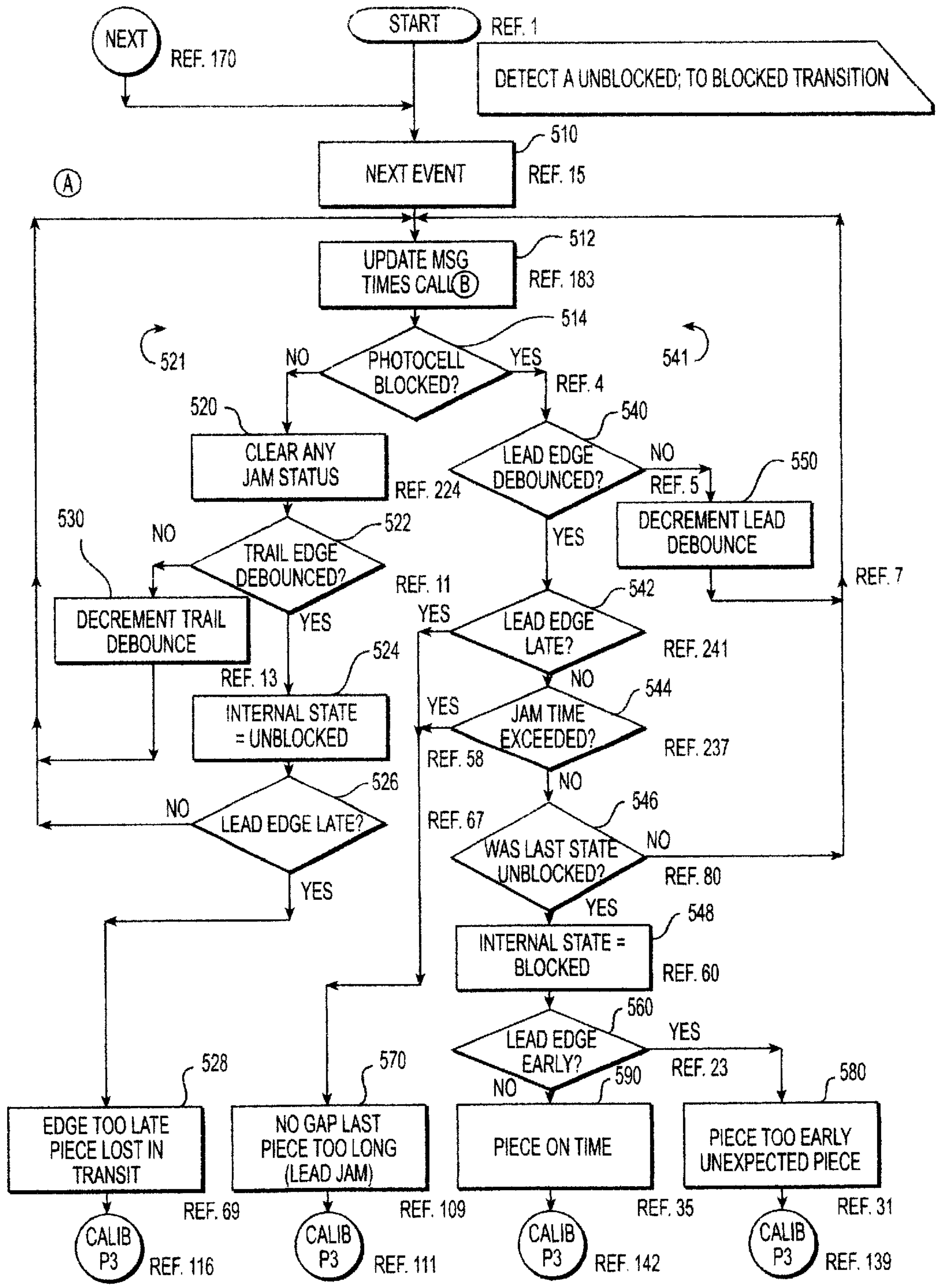
Figure 5B:
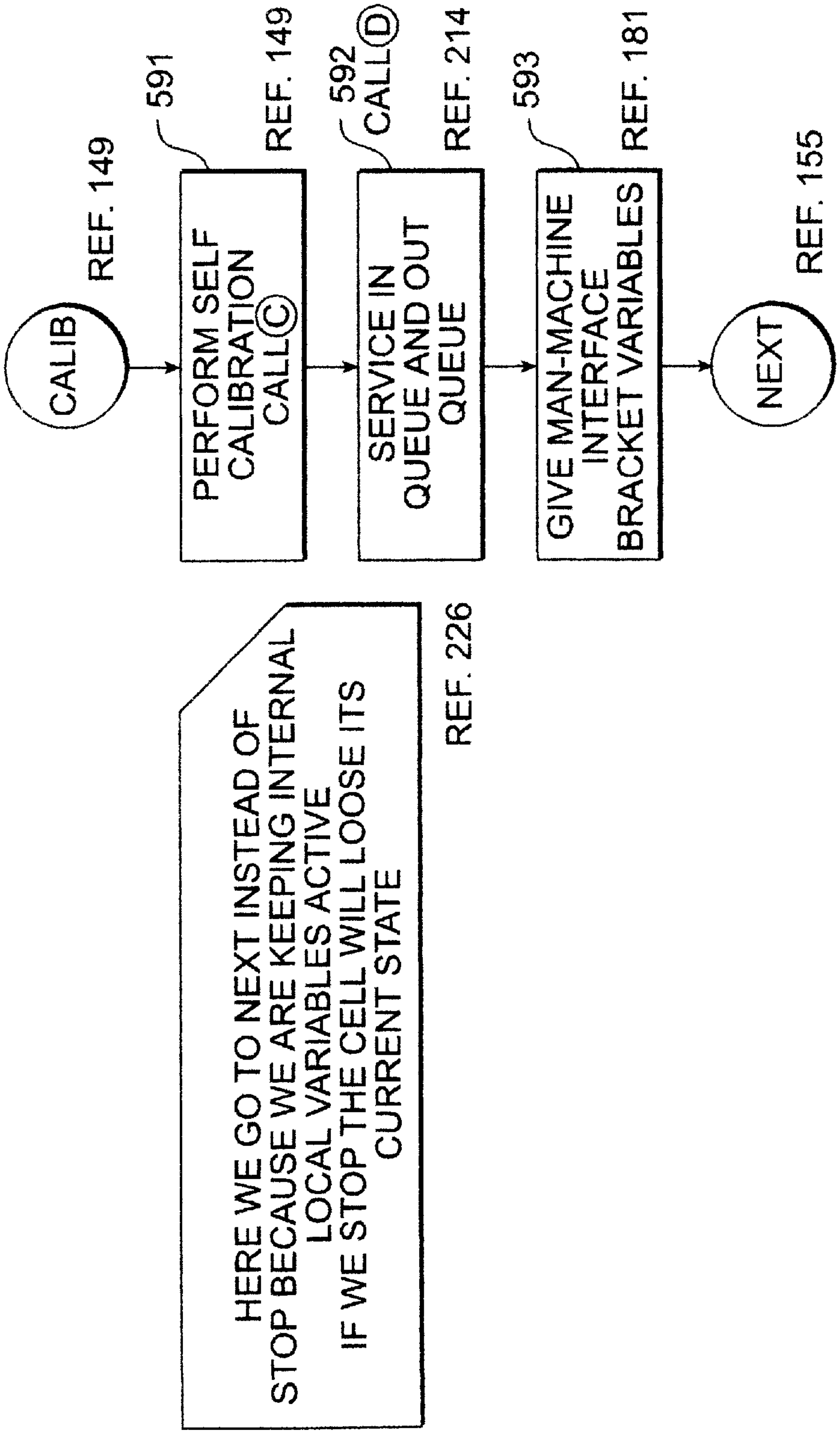
Figure 5C:
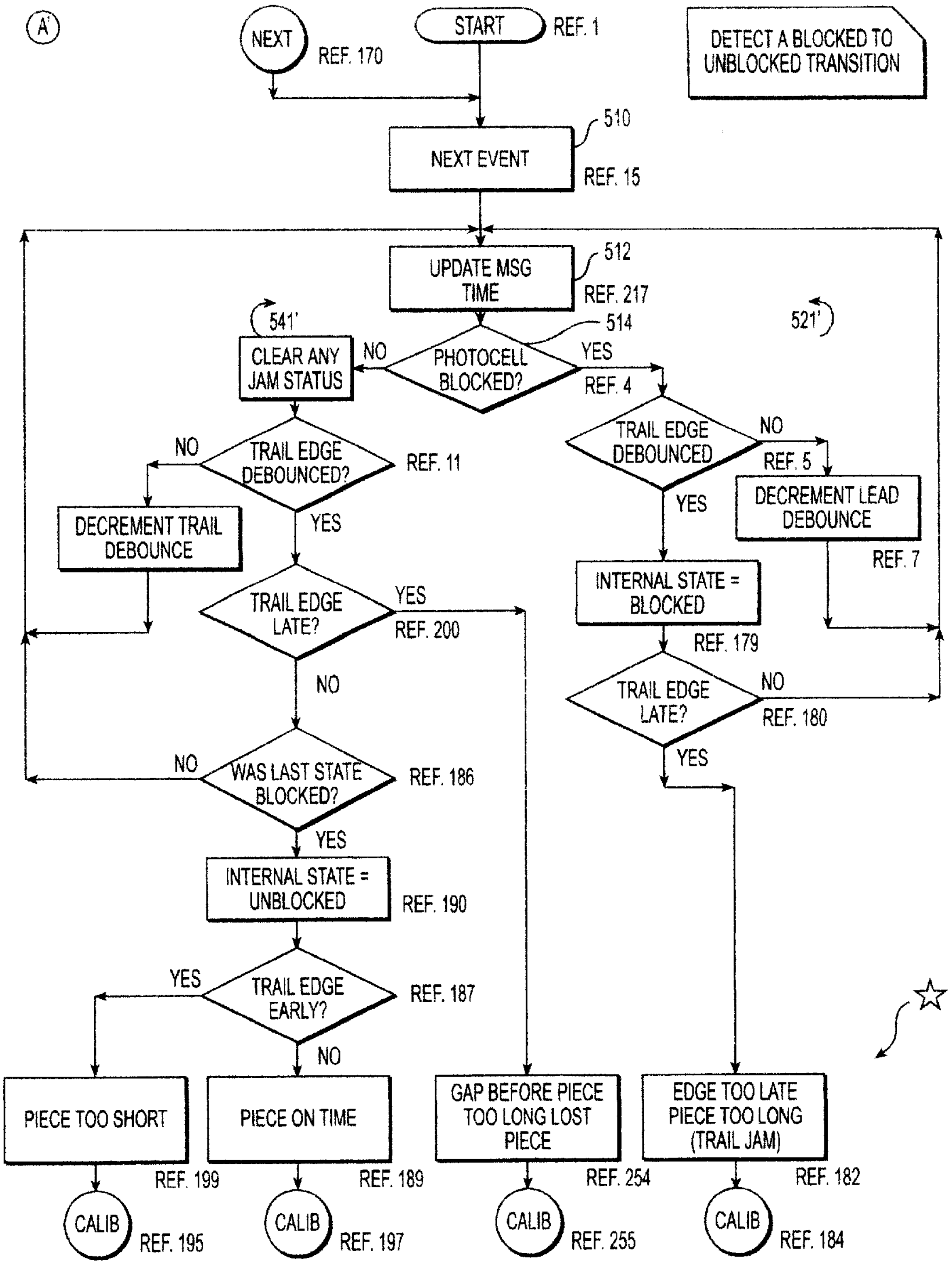
Figure 5D:
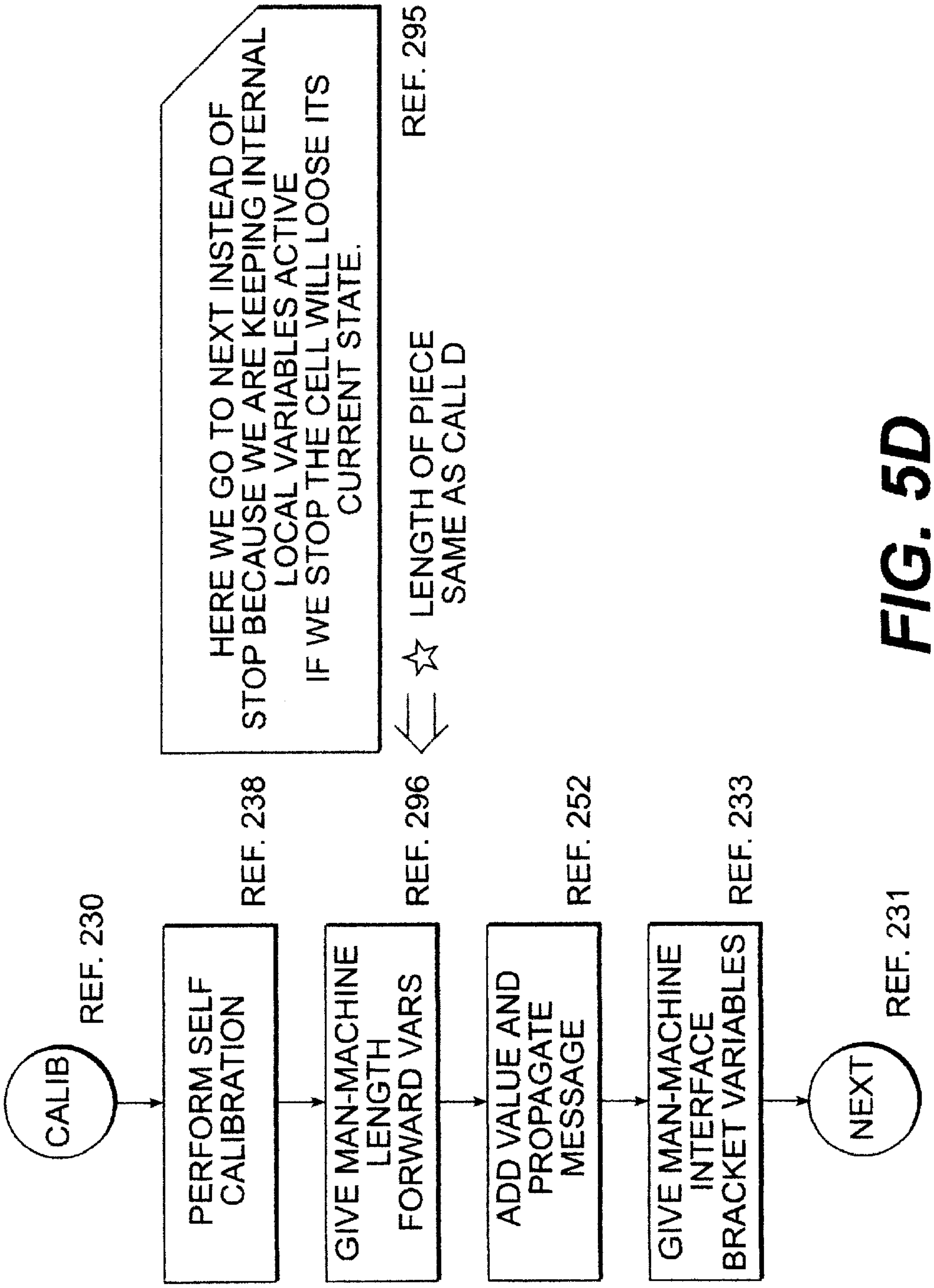

In this regard, it should be recalled from the foregoing that a softcell is capable of detecting either a leading edge event or a trailing edge event depending on softcell type and the operational mode e.g. synchronous, asynchronous or predictive) in which the softcell is placed. If the softcell can detect a leading edge event, the subroutine of FIGS. 5A and 5B is called. If the softcell can detect a trailing edge event, the subroutine of FIGS. 5C and 5D is called. These subroutines are similar but include some differences specific to the physical properties of the edge events.

Referring now to FIGS. 5A and 5B, it should first be noted that the process can be entered either directly or from the end of FIG. 5B ("next") and terminates with specific diagnostics and calling of the calibration function of FIG. 5B which returns the process to operate upon the next event which is called at 510. Also, it should be noted that FIGS. 5A–5D and FIG. 6 assume, for convenience, that the sensor is a photocell and a leading edge is thus a transition from and unblocked to blocked condition (FIGS. 5A and 5B) and that a trailing edge is a transition from a blocked to unblocked condition (FIGS. 5C and 5D). When the next event is called, a further subroutine shown in FIG. 6 is called, as illustrated in FIG. 6 which is performed to ascertain that all data required is available in correctly set up data structures.

Figure 6:
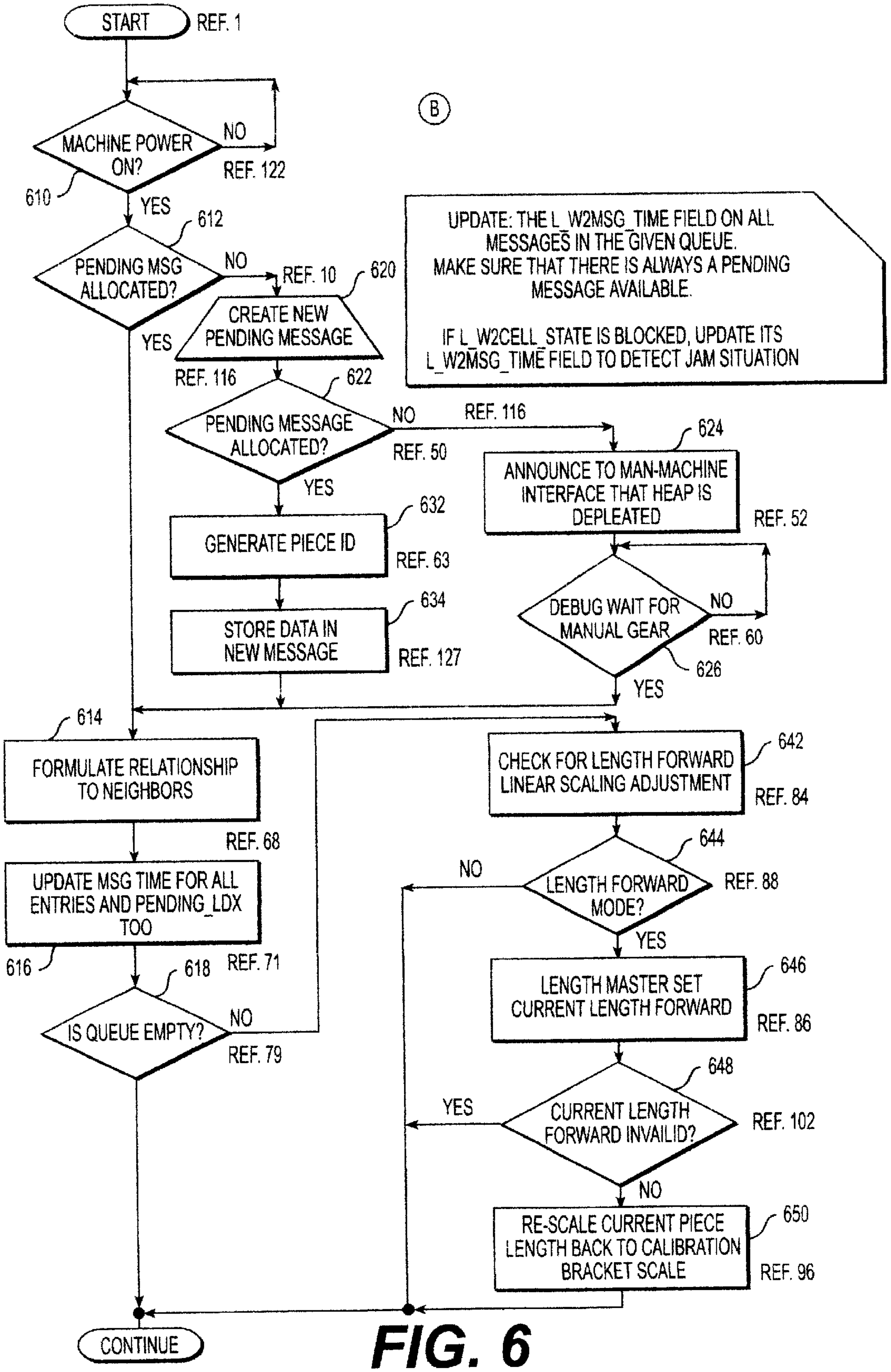
FIG. 6 is a flow chart depicting a sub-routine of FIG. 5A or 5C for generating messages passed between softcells.

Referring now to FIG. 6 a check is first made that power is available to the sorting machine at step 610 and if not, the process loops until power is on. This prevents the unnecessary processing of unpowered spurious I/O events. Then, at step 612, it is determined if a pending message to be sent upon processing an event or an error in regard to the next article or piece has been allocated. Pending messages are pre-allocated for speed when the input queue is empty of messages so that there may be an available object for aging during a potential system jam or spurious event and transferred quickly to the output queue, as needed, depending on softcell mode. The pending message is sent if no message is in the softcell input queue when a jam is asserted. More specifically, in asynchronous mode, allocation of a message provides a message to be output when no message is in the input queue. In synchronous and predictive modes a message is generated when an unexpected article appears with the input queue empty, referred to as a ghost event and reported and thereafter tracked in accordance with the pending message sent.

The allocation of specific messages is important to plenary logging of machine operation (and informing an operator thereof through a display or other annunciator) to account for all articles or pieces sorted or rejected. While not necessary to the successful operation or practice of the invention, such full accounting record is considered to be an extremely important function to be realized. Therefore, after creation of a new pending message at step 620, allocation of the message is again checked at step 622. If a pending message has not been allocated successfully, a message is generated on a man-machine interface (MMI) such as the graphic user interface (GUI), alluded to above, at step 624 and manual intervention and debugging is required at step 626 before the process is allowed to proceed, since message allocation failure is a fatal error in a real time machine.

If the message, an exemplary and preferred form of which is shown in FIG. 11, has been successfully allocated, a ghost message identification pending message is held and used only if a message is not available from the input queue. When the event occurs, the pending message is loaded with preliminary data and a unique ghost identifier. At step 618, if the queue has a message, that message is forwarded but if the queue is empty, the pending message is sent.

Once a pending message is available, the relationship of the softcell to its neighbors is formulated at step 614. The relationship is preferably expressed by information passed in the message from upstream and determines if the sensor of the current softcell is shared with the upstream neighbor and the type (leading edge or trailing edge) of the current and upstream softcell. The neighbor relationship is used in length forward calculations and the rules base for making reject/non-reject determinations, especially on spurious events. If spurious events are seen by neighboring softcells, a spurious event on the same sensor can automatically flush to the output queue, or alternatively to a flush queue.

Next, the message time is updated or aged for all entries in the softcell input queue and pending messages as shown at step 616. If the queue is empty, as determined at 618, control is passed back to the process of FIG. 5A or 5C. However, if there is at least one message in the queue, the message is checked for a length forward linear scaling adjustment indicating a difference in article length from the calibration length. The length difference and difference factor is calculated. Ideally the lafter would be near zero if the transport had very little mechanical and electrical variance and/or latency. It is then determined if length forward mode is enabled on this softcell; an option not needed where the types of softcells are the same in lead—lead or trail—trail tracking. If not, the process is complete and branches to 514 of FIG. 5A or 5C at step 644. If so, step 646 determines if the softcell is a length-master and, if not, the length forward value is set in accordance with the measurement made by an upstream length-master, as described above and checked for validity at step 648. If the length forward is invalid (which may cause the softcell, if it is a trail type softcell of a lead-trail pair, to automatically become a default length-master to attempt to establish a valid length), then control branches to 514 but if the length forward is valid, the current piece or article is scaled to correspond to the calibration length of the timing bracket, as described above before continuing at 514.

Returning now to FIG. 5A or 5C it is determined at 514 if the sensor has changed state. If the sensor is unblocked, any existing status signal indicating a jam is cleared at step 520 and the previous sensor state is checked for having been debounced to a contiguous unblocked state (to prevent a spurious ringing of the sensor responsive to the trailing edge event of the article from being detected as a valid unblocked state). That is, while a leading edge type softcell reports only leading edges, trailing edges must be cleared before retriggering.

Debouncing is performed at step 530 if necessary and the message/aging time is updated by counting cycles and looping to 512. If, at any time during debounce, an unblocked state is seen, debounce is reset and the debounce count check begins again (and vice-versa for trailing edge debounce). If the trailing edge has been debounced, the internal state of the softcell is set to “unblocked” at step 524 and the message age is checked against the timing bracket to determine if the predicted leading edge event is late. If not, the process loops to update/age the message and continue to wait for the predicted leading edge event. However, when the message age reaches the late limit of the timing bracket, the process branches to 528 to diagnose an article lost in transit.

When the sensor is found to be blocked at 514, it is determined at step 540 if the leading edge has been debounced and debouncing is carried out if necessary by looping through step 550 to step 514. It is then determined if the leading edge was late (note that the message age is incremented at 514 after steps 530, 526, 546 and/or 550) at step 542 or the jam time has been exceeded at step 544. If either time limit has been exceeded the process branches to diagnostic step 570 where it is determined that there was no gap between articles, as expected which could be due to a lead jam, an article exceeding length limits or a collision between articles causing an overlap; any of which could prevent the detection of a leading edge event after a previous leading edge event. In general, to trigger a leading edge event, there must be an existing unblocked state, a blocked sensor must be debounced to a blocked state. A subsequent unblocked sensor must be debounced to an unblocked state before another leading edge can be triggered.

If the leading edge event is not late or the jam time exceeded, the pending message is aged if there is no message in the queue (and, if the age exceed the time at which a jam is asserted, a specific jam fault is reposted) and the internal state is checked for having been unblocked (e.g. at step 524). If not, the process loops to 512 to further age the message in the input queue of the softcell. If the internal state of the softcell had been unblocked, it is now set to a logical “blocked” state at step 548 and it is determined by comparison with the timing bracket and fuzzy bracket 22, in particular, if the detected leading edge was early. It is to be appreciated that all events that occur while the input queue is empty will cause the pending message to be sent as a ghost message and will be automatically routed by the flow logic to 580. Pending message time always defaults to zero at 548. If so, it is considered an unexpected piece at 580. If not, it is confirmed as being on time at step 590. In this case or any of the diagnostic functions 528, 570 or 580, the self-calibration function of FIG. 5B is now carried out. This function calls the processes 591, 592 of FIG. 7 and FIGS. 8A and 8B, respectively, in turn as will be described below, and reports the resulting values to the MMI/GUI at step 593. Since these subroutines are also called by the process of FIG. 5D following the subroutine of FIG. 5C, the latter will now be described.

As noted above, the processes of FIGS. 5C and 5D are similar to those of FIGS. 5A and 5B but are directed to trailing edge events. The processes begin with identical steps 510–514 and are generally parallel but operate on the blocked to unblocked transition. Therefore, but for interchange of the conditions of the internal states of the trailing edge softcell relative to the leading edge softcell, the processes are substantially the same. As a general rule, to trigger a trailing edge event, there must be a blocked state and a debounced unblocked state. A debounced blocked state is required to clear the event and allow triggering of the next trailing edge.

For example, loop 521' of FIG. 5C performs substantially the same process for a leading edge that loop 512 performs for a trailing edge in FIG. 5A except that the clearing of a jam status need not be performed. Similarly, loops 541' perform substantially the same function for a trailing edge as is performed for a leading edge in loops 541 of FIG. 5A except that testing of the jam time being exceeded is not necessary. This is true because in a trailing edge event situation, the predicted article length determines the error condition and logic flows the same way in a jam condition. Only if the softcell is in a logical blocked state at the time the late comparison is made with the length at which jam is asserted is a specific jam fault reported in the message. In the case where the input queue is empty and the softcell is in a blocked state, the pending message will be aged for the purpose of detecting a jam. Again, all paths having different diagnostic and tracking meanings (piece too short, gap before piece too long/piece lost, edge too late/piece too long and piece on time) of FIG. 5C lead to the self-calibration subroutine of FIG. 5D which include the sequential calling of the subroutines of FIG. 7 and FIGS. 8A and 8B and the reporting of results via MMI/GUI.

Figure 7:
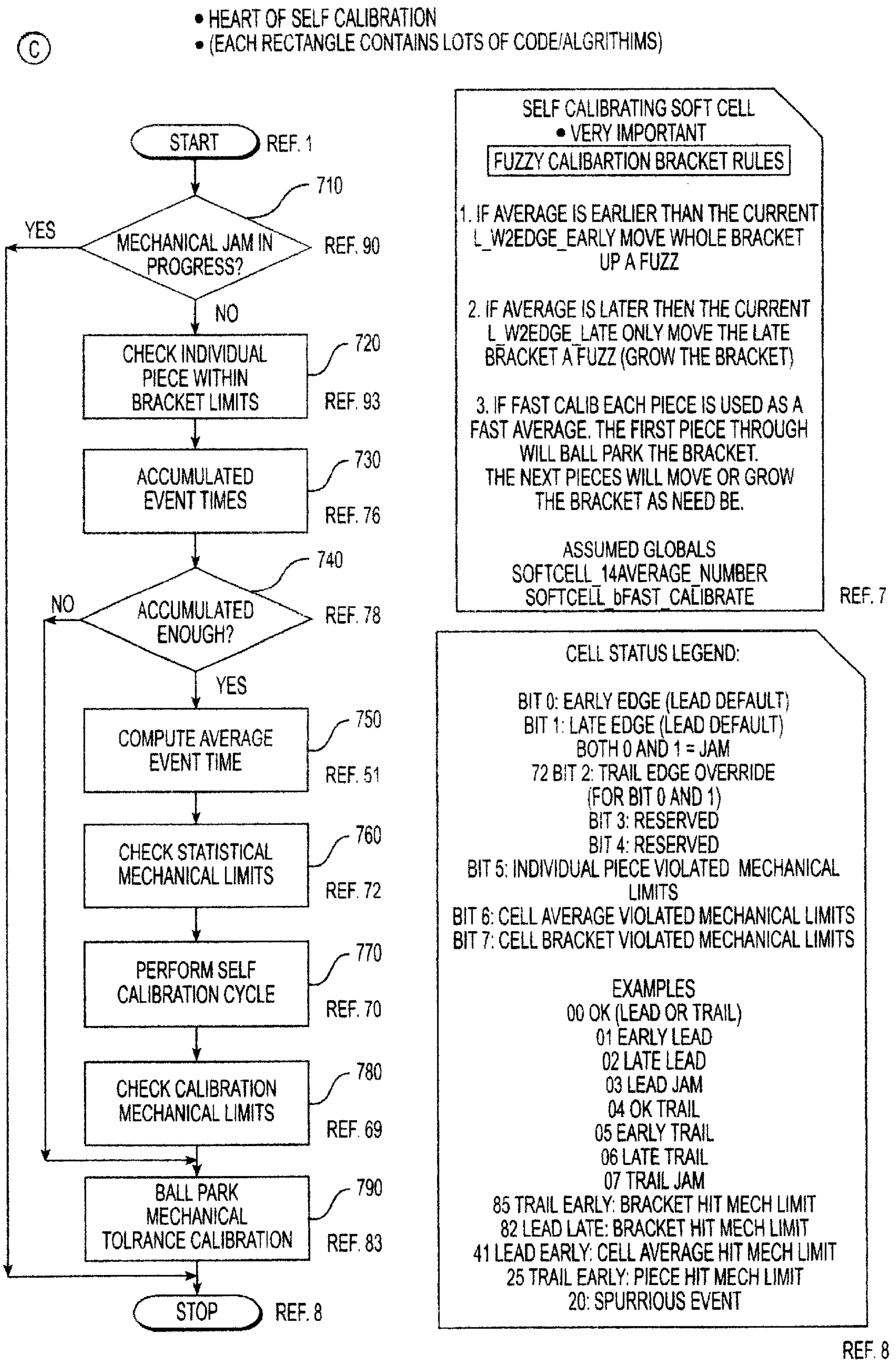
FIG. 7 is a flow chart illustrating implementation of fuzy calibration bracket rules in accordance with the invention as a sub-routine of FIGS. 5B and 5D, FIGS. 8A and 8B, together, form a flow chart illustrating control of the sorting apparatus and error detection and recovery as a further subroutine of FIG. 5B.

Referring now to FIG. 7, a flow chart depicting the self-calibration process is shown. First, acceptable data for self-calibration must be discriminated and timing data that may result from jamming of the transport arrangement must not be used. Thus checking for a current jam in progress is performed at step 710 and the self-calibration process is bypassed if a jam currently exists. For good data, the individual article times are checked to be within bracket limits and the status of the message reflects errors at step 720, individual event times are accumulated at step 730 and the number of accumulated event times (preferably from about four to one thousand or more) is evaluated at step 740. (Steps 720–790 are essentially subroutines which may include branching operations among other operations and are thus depicted as steps for clarity.)

In other words if fast calibration is on or enabled, one event is accumulated over a calibration cycle and calibration is performed on the average of that piece. If fast calibration is off or disabled, continuous calibration is the default, many (2n) events are accumulated and the calibration cycle is performed after n pieces using the average of the previous 2n pieces. This step (740) effectively switches between fast calibration and continuous calibration, discussed above. For the first few pieces or articles less than the desired number of accumulated event times, each article is used for a coarse or “ball-park” self-calibration. Once a suitable number of event times has been accumulated, the same self-calibration process using an average of the accumulated event times, processed as discussed below performs a fine self-calibration adjustment. As alluded to above, the fast calibration avoids a need to manually provide an initial calibration and quantitative definition of the timing bracket for the softcell or selected parameters thereof. Should the need arise, manual adjustments are allowed.

Assuming an adequate number of event times have been accumulated to provide a statistically meaningful average, the bracket statistical average event time is computed at step 750 and compared with statistical mechanical limits at 760 an generates limit violator signals as needed. The self-calibration operation is then performed as illustrated at 770, applying the above-discussed calibration rules or other suitable rules, as will be apparent to those skilled in the art in view of this discussion, to move or grow the fuzzy bracket (each by a fuzz [i.e., a relatively small amount] per iteration) and the resulting bracket position and size is checked against the calibration mechanical limits at 780. If the change in the fuzzy bracket remains suitably within the calibration mechanical limits, the fuzzy bracket parameters are updated at 790 to complete the self-calibration process. The fuzzy bracket limits will be used for tracking/error decisions for the present and subsequent articles/events.

Figure 8A:
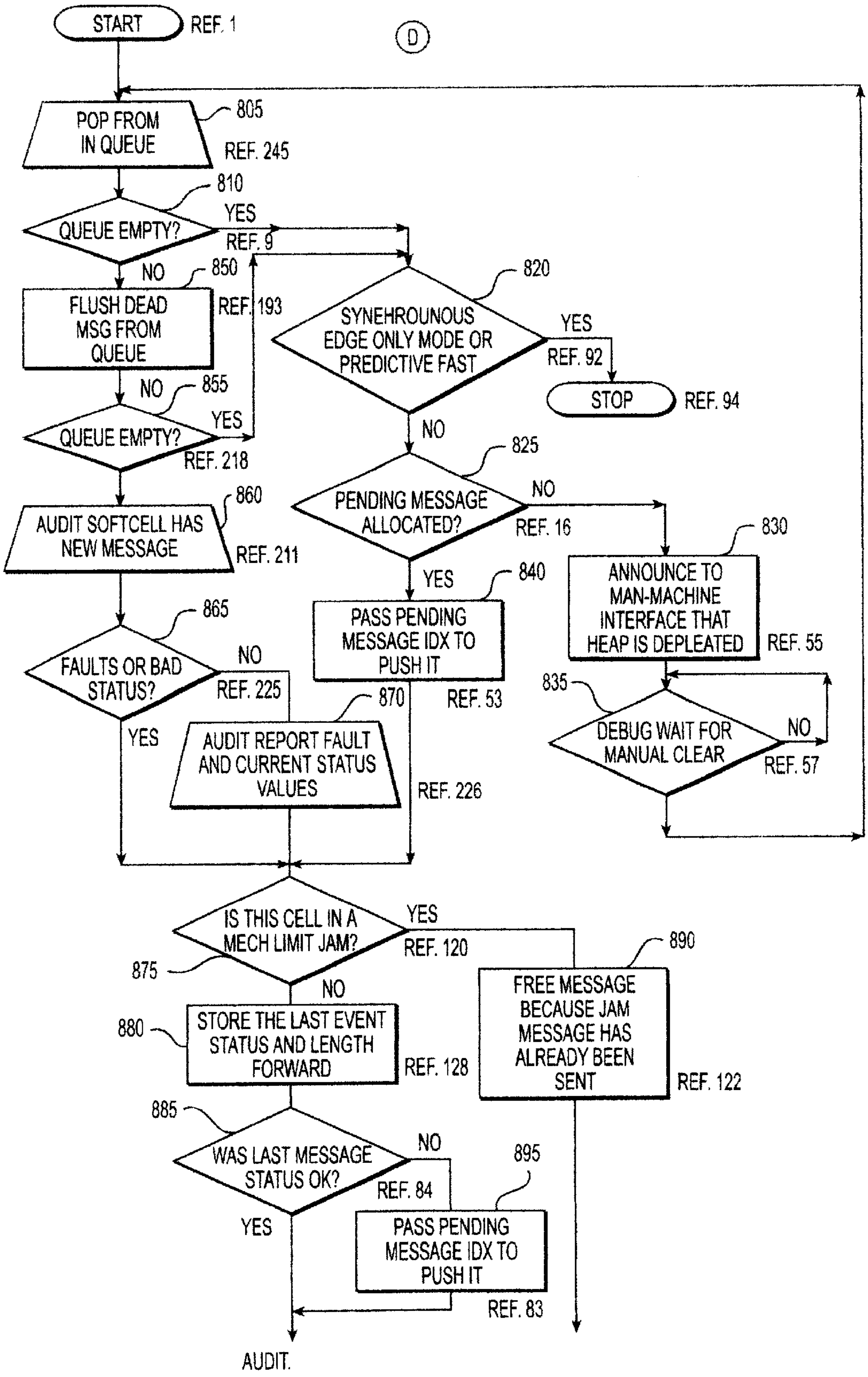
Figure 8B:
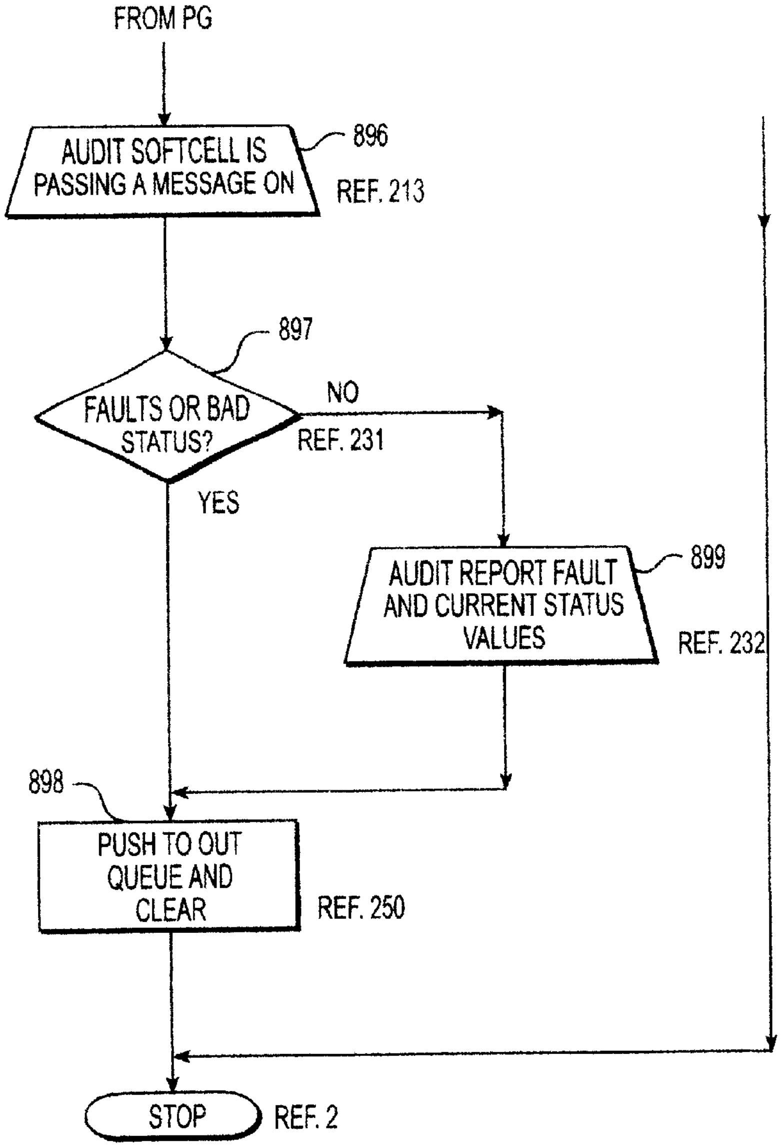

Referring now to FIGS. 8A and 8B, a flow chart of the decision process for tracking will be discussed. It is important to note that even though the input queue was evaluated earlier, nothing has been in the original message received. Status codes are held in internal variables and passed to the process of FIG. 8A. It is in this process that the softcells function as an expert system in regard to the portion of the transport path to which they respectively correspond. Basically, the process depicted decides whether event status assigned to this event is such that it can unequivocally be accepted as indicating a high integrity event that corresponds with an identity/location relationship with a high degree of confidence or whether it should be rejected as representing an error that could compromise accounting for the article associated with the event.

At any given softcell, this process begins with the popping of a message from the softcell input queue at step 805 and, if unsuccessful, determining that the input queue is empty at step 810. If the input queue is not empty, dead messages (e.g. timed out from aging, as described above, beyond the mechanical late limit) are flushed from the input queue directly to the output queue, as illustrated at 850 (alternatively they may be flushed directly to a secondary flush queue), and again determining if the queue has become empty as a result of that operation at step 855 which would trigger a transmission of a pending message. If the queue is empty at either 810 or 855, the process branches to 820 where the current mode of the softcell is evaluated.

If the softcell is operating in the synchronous mode (in which events are reported regardless of predicted time as long as a message is present in the input queue and an event is processing because output messages are triggered if input is available or in the predictive mode with fast self-calibration operational (e.g. for the first few articles processed). In this latter case it is not desirable to report spurious error due to bad calibration and the reject decision is skipped. In either of these cases no action is taken and the event is ignored.

If the softcell is in the asynchronous mode (to report all events) or in the predictive mode during continuous calibration, it is determined if the pending message taken from the queue at 805 has been allocated at step 825 and a process similar to that described above in connection with FIG. 6 is performed at steps 830 and 835 to suspend operation until manual intervention to debug and clear the condition can be performed, since message allocation failure is a fatal error in a real time system. At this point, an event has occurred without a corresponding message in the input queue and the pending message is sent in its place. If the message has been allocated, the ghost identification from the pending message is pushed onto the softcell output queue 18 at step 840. The process then resumes at step 875.

Assuming the softcell input queue 17 was not found to be empty at steps 810 or 855, an audit string is generated at 860. Audit strings send logging information to a buffer that eventually is transferred to the MMI/GUI of FIG. 5D, giving deep diagnostics and troubleshooting capabilities. The message is then checked for faults or bad status at step 865 and, if applicable, an audit string is generated to report faults and current status values. At this point, special action is taken on the current message, beginning at step 875 if it is determined if a mechanical limit jam exists. If so, the message is discarded by flushing dead messages and the process is complete.

If no mechanical limit jam is posted, the last event status (e.g. the status of the current event) and length forward are stored at step 880 and it is determined if the previous cell's status needs to be stored in the first bad status field at step 885. If not, the information of the last message (e.g. the first bad status if the previous cell's status was bad and the first bad field was zero is stored with the length forward data at step 895. This serves to log all processing in which a potential error may exist which could compromise the relationship of identity and location or cause a sorting error even when the processing is not interrupted. An audit string is then generated at step 896 to indicate that a message is being passed to a downstream softcell and, if faults of bad status has been indicated as determined at step 897, a further audit string is appended thereto to report the same at step 899. In either case, the softcell message thus assembled is pushed to the output queue of the softcell and the softcell is cleared to await the next message or event. Audit strings are then logged to disk, reported and/or displayed as desired by the MMI/GUI as shown in FIGS. 5B and/or 5D.

Figure 9:
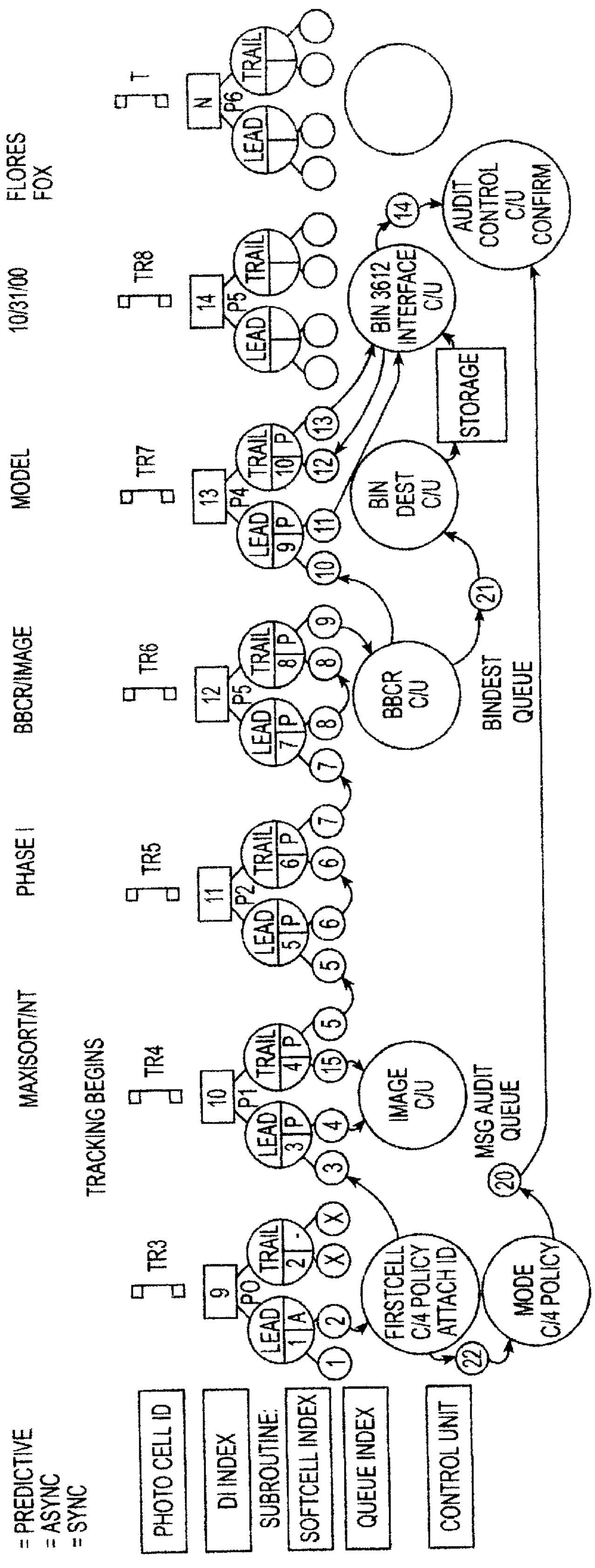
FIG. 9 is a schematic diagram illustrating an application of the invention to a tracking chain of an exemplary sorter apparatus with peripherals.
Figure 10:
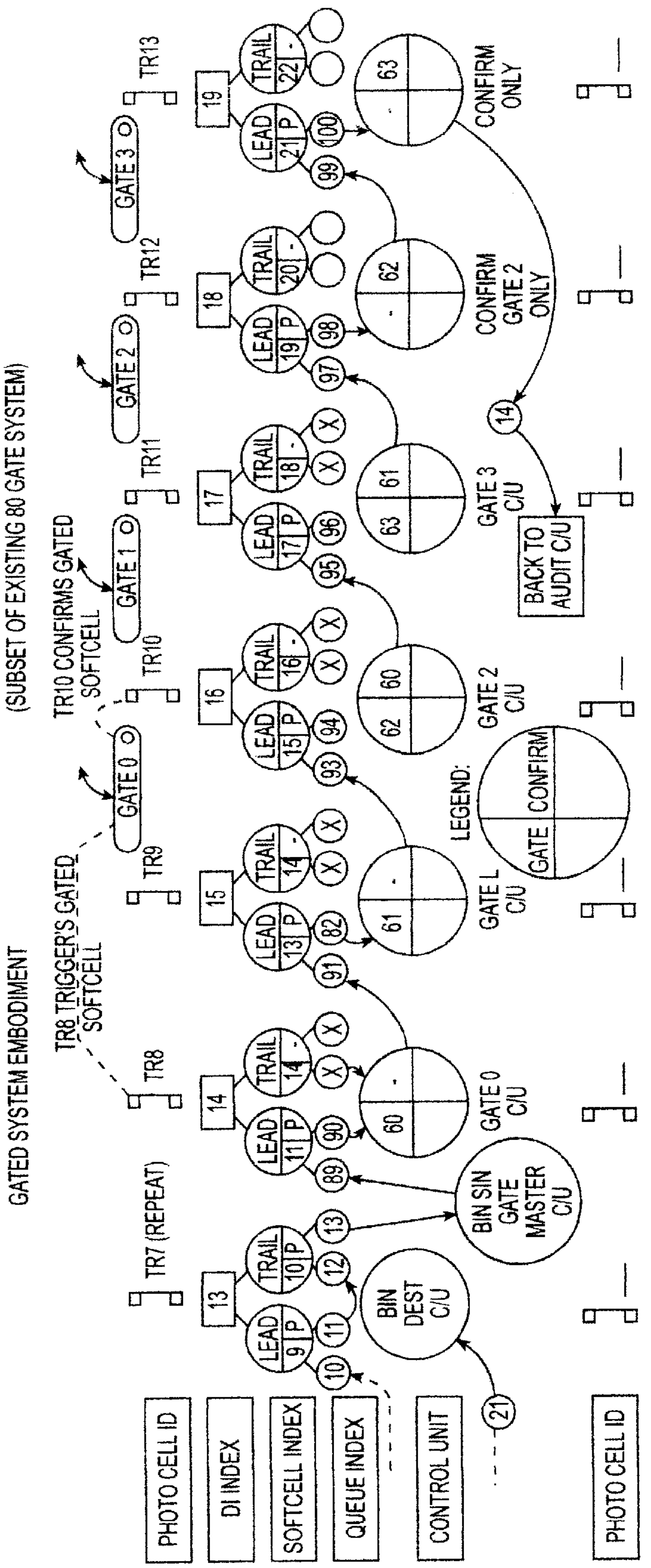
FIG. 10 is an alternative implementation of the system of FIG. 9.
Figure 12:
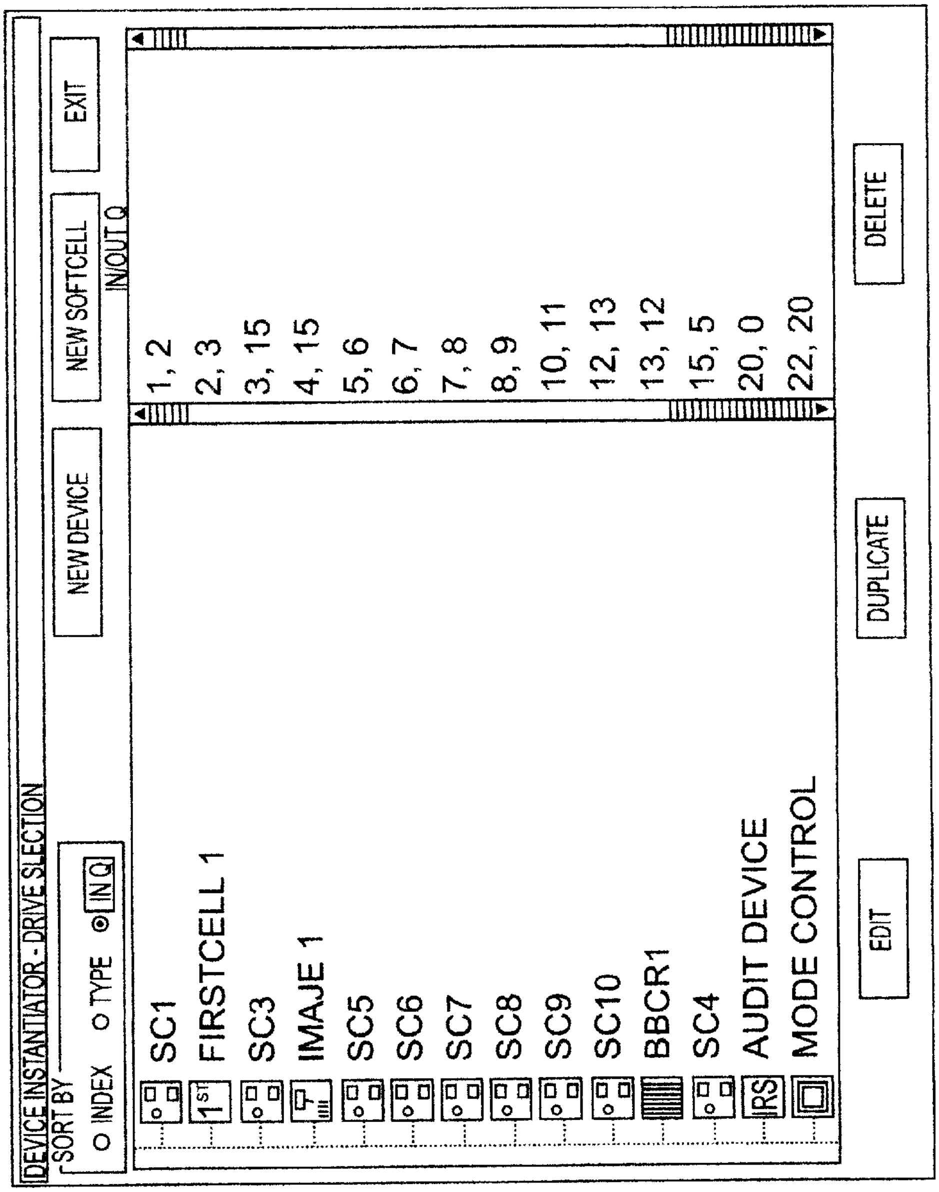
FIG. 12 shows a GUI for configuring and managing devices and softcells in a tracking chain.

Referring now to FIG. 9, an exemplary application and embodiment of the invention in an exemplary sorting apparatus will now be discussed. It should be understood that FIG. 9 represents an application of the invention as retro-fitted to an existing sorter in which tracking to a specific sort bin is performed autonomously, to the extent possible by a stand-alone mechanism and its controller. An embodiment where softcells provide tracking over the complete transport path will be discussed in connection with FIG. 10.

It should be appreciated that the softcells, numbered consecutively for simplicity in FIG. 9, are of alternating leading edge and trailing edge types. Pairs of consecutive softcells beginning with an odd number correspond to the arrangement of FIG. 2 and pairs of softcells beginning with an even number correspond to the arrangement of FIG. 3. Softcell numbered 1 to 10 comprise a continuous tracking chain and length measurement and identification confirmation can be performed with any pair of consecutive softcells in the tracking chain.

The first softcell (number 1) in the chain is preferably run in the asynchronous mode to report every event observed. In this case, soft cell number 2 is not used but could be used in the synchronous or predictive mode to measure each article (as a length master) and/or confirm correct operation of softcell number 1.

It should also be appreciated that since softcells are embodied as software objects, as discussed above, as many softcells can be provided as may be desired with virtually no hardware costs other than the memory and processor capacity necessary to handle the messages in a deterministic manner. However, it may be desirable to arrange the softcells so that the length-master is at a different convenient location, depending on the physical constraints of the sorter hardware. That is, it may be convenient to have another pair of softcells (e.g. 5–6) function as a length-master. Complex permutations of softcells and their higher level modules, “control units” (C/U), can be freely arranged with few constraints as long as control units deterministically pass messages back to the softcells in a timely manner.

The output queue of softcell number 1 is provided to a control unit referred to as “firstcell” which has the function of attaching an identification to the message forwarded to the next softcell (e.g. number 3). (It should be understood that the numerical message identifications shown are arbitrary and need not be numerical or consecutive but only unique over a time period adequate for a given article to traverse the tracking chain.) The firstcell C/U also provides a message 22 to a mode C/U which implements support for the tracking policy and prepares data structures for valid identifications of articles and establishes a message audit queue 20.

Tracking begins with softcell number 3 which outputs an observed event to a control unit (“Imaje”; corresponding to a preferred printer, available commercially). Softcell number 4 confirms receipt of a valid message upon detection of a trailing edge event and can initiate or confirm printing of any desired indicia on the article (e.g. a bar code, postage cancellation, and the like). One or more pairs of softcells (e.g. 5–6 or 7–8) are preferably provided periodically to reconfirm and correct proper tracking by the transport apparatus even where no other peripheral function may be required. The longer the distance between sensors, the more physical error can build up regarding the position of the article due to the physics of the transport mechanism. Well-placed sensors allow continuous tracking and error correction using fresh time predictions. Small sensor spacing also allows a smaller section of the transport apparatus to be specified if an error or jam is reported.

Softcell number 8 outputs a message (9) to a C/U of, for example, a bar code reader BBCR which confirms the tracking of each article with an identification applied thereto by, for example, a printer or a logging arrangement which then passes the message (10) on to softcell number 9 This control unit then establishes a bin destination queue for the sorter control unit and the bin destination is placed in storage. The output of softcell 9 is communicated to the sorter C/U (Bin 3612) which communicates bi-directionally with trailing edge softcell 10 to perform the sorting function, such as to assure article separation when sorting diverter mechanisms are controlled to avoid erroneous sorting. C/U (Bin 3612) also communicates bi-directionally with memory storing identifications to determine control of sorting gates. Output information (14) from this controller is provided with the message audit queue (20) to the audit control unit to reconcile messages, to confirm delivery of each article to a sort bin and report errors such as tracking errors, lost data, lost articles, incorrect diverter gating, and the like.

Referring now to FIG. 10, a variant form of the invention is shown as would preferably be applied to a new sorting machine constructed to employ the present invention throughout its extent. The operation of this variant form of the invention is the same as that described above in regard to FIG. 9 through softcell 9. However, in this case softcell 9 communicates message 11 to softcell 10 (by which a length measurement and identification confirmation can be made) and output message 13 is communicated to a gate-master control unit before being passed to GateO C/U that passes the message to softcell 13 while determining and control action necessary for Gate0. This connection is replicated for following (in this case, odd-numbered) leading edge predictive softcells. However, after a suitable interval to allow mechanical gate movement (in this case two softcells or pairs), the sensors are used to monitor sorting gate actuation.

If the gate motion is determined to be correct and the article properly removed from the sorting path to the correct sorting bin, the message is suitably marked with a confirmation associated with the designated sorting gate. If not, both the article and an error message are transmitted from softcell to softcell until the article reaches one or more default bins at the end of the transport path. At these default bins, articles can be sorted in accordance with the error reported and/or placed in a terminal (mechanical or reject) sort bin. The control units for these default bins only serve to confirm actuation of their respective gates or report an error. The control unit of the last bin outputs information reflecting the actual sorting of articles for comparison with the audit queue to account for each an every article placed in the system.

A preferred format for message between softcells is illustrated in FIG. 11. The parts of the message shown in the first column contains forward and backward links (which are preferably established to form a simple queueing mechanism or message stacks or independent messages for other purposes or to accommodate particular path topologies and geometries or other purposes through selection through the MMI/GUI alluded to above), identifications, accumulated time, current and first bad status codes (the latter preferably as the output queue where the first bad status appeared), last neighbor's softcell index and predicted piece length, as indicated in the upper entries of the second column. These parameters can be expressed in a relatively few bytes of code preferably organized as discussed above and are sufficient to full tracking and reporting prior to sorting. Once sorting is begun by assignment of destination bins, additional data is added to indicate particular errors in sorting, as detected.

In view of the foregoing, it is seen that the invention provides several layers of confirmation and reporting of article handling, identification and sorting with full accounting for every article or piece placed in the system, full operational diagnostics, rapid jam reporting to avoid article damage, and full logging and audit accounting for error recovery. The system is completely hardware-independent and capable of application to any article transport arrangement or modification thereof. Implementation therewith is simplified by a graphical user interface allowing a simple procedure to establish softcells and to organize their linking into chains as well as GUI tools for peripheral configuration and calibration of the system.

As an example of the latter, parallel chains can be formed or additional single softcells provided for accommodation of any desired purpose (e.g. different types of control over different path branches or single softcells for measuring and/or controlling gaps between articles) by using a pointing device with a GUI to create softcells associated with particular sensors, specify their type and mode and relate them to particular sensors with, for example, a drag and drop operation familiar to those skilled in the art. The invention is thus made readily applicable to any article or document (e.g. negotiable instruments) handling system such as for handling and sorting of letters, flats, packages or tray handlers, parcel bundle systems, article delivery systems, conveyors and the like. The invention would be of advantage in any other system where full accounting for articles is of importance.

Figure 13:
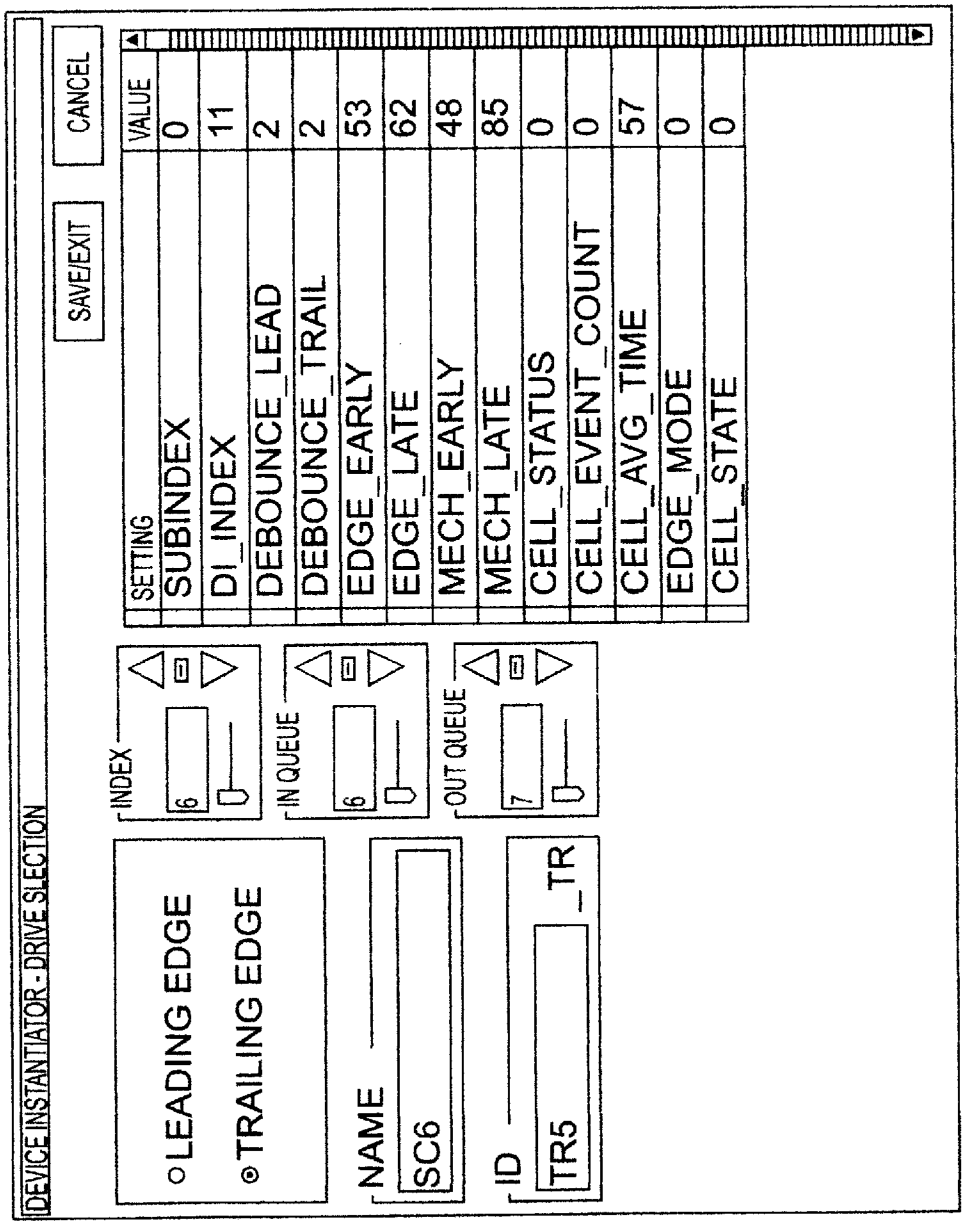
FIG. 13 shows a preferred GUI for a softcell system editor.

Referring now to FIGS. 12 through 16, GUIs for facilitating the management of softcells in a preferred environment are shown. The GUI shown in FIG. 12 may be used to add, delete, arrange and coordinate devices and softcells in a tracking chain. The devices and softcells may be selectively sorted by index, type or input queue number. The "New Softcell" button calls a softcell editor, as shown in FIG. 13, which may be used to configure a softcell.

Referring to FIG. 13, the softcell editor GUI provides tools for configuring softcells. The editor facilitates configuration of a softcell to detect "Leading Edge" or "Trailing Edge" events. The editor also provides tools for identifying the softcell and establishing in-queue and out-queue relationships. Values for various settings are provided. The editor may supply some initial default values, require user input of certain values and derive some values from system performance. The settings may include any softcell variables or attributes, such as debounce values (e.g., "Debounce_Lead" and "Debounce_Trail"), which may be set to account for sensor and tracked article characteristics, fuzzy bracket and mechanical limits (e.g., "Edge_Early", "Edge_Late", "Mech_Early" and "Mech_Late"), event counters (e.g., "Cell_Event_Count") and an average temporal value for the occurrence of an event over a specified time or number of articles tracked (e.g., "Cell_Avg_Time").

Figure 14:
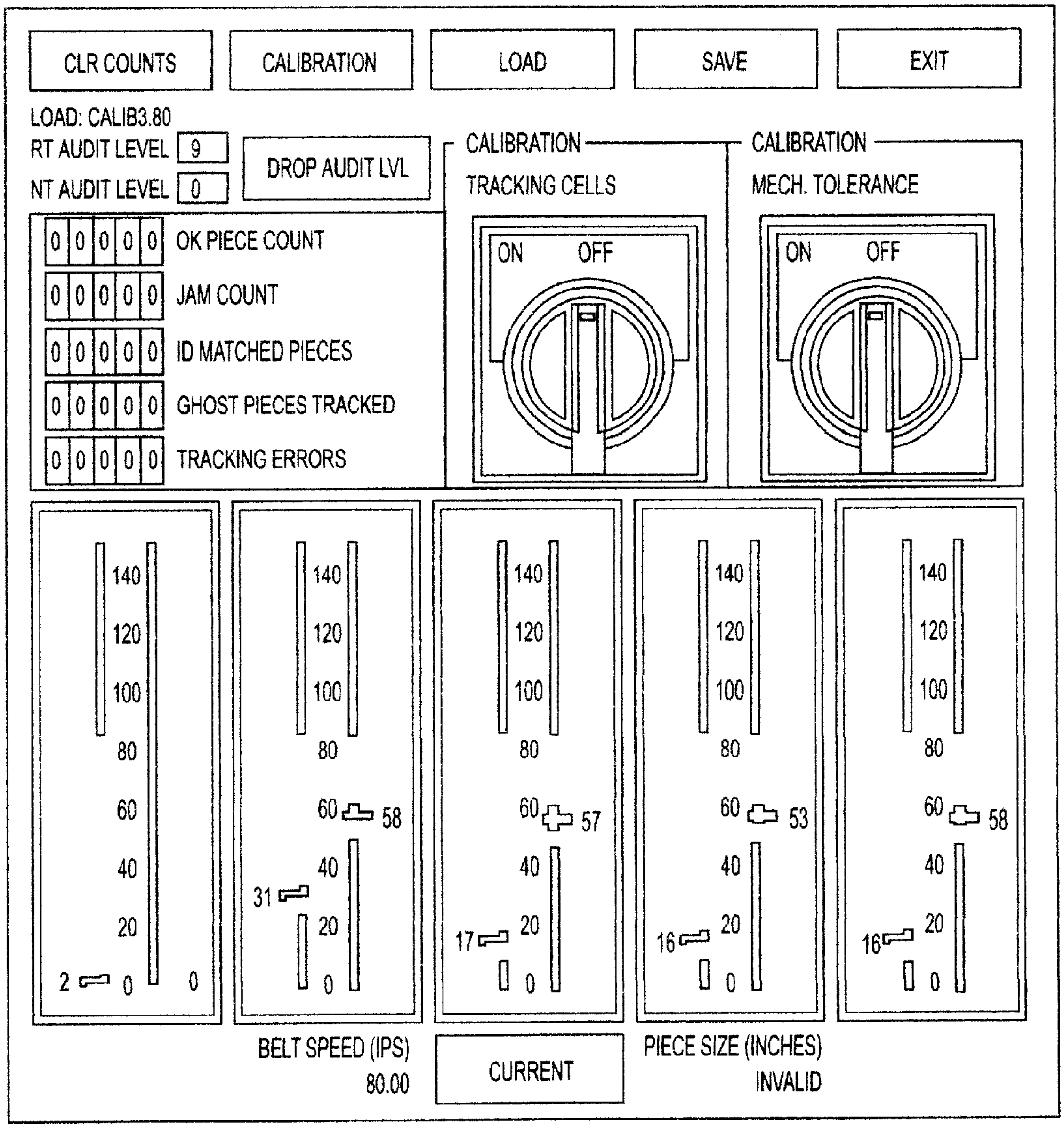
FIG. 14 shows a preferred GUI for monitoring tracking chain performance and initiating calibrations.
Figure 15:
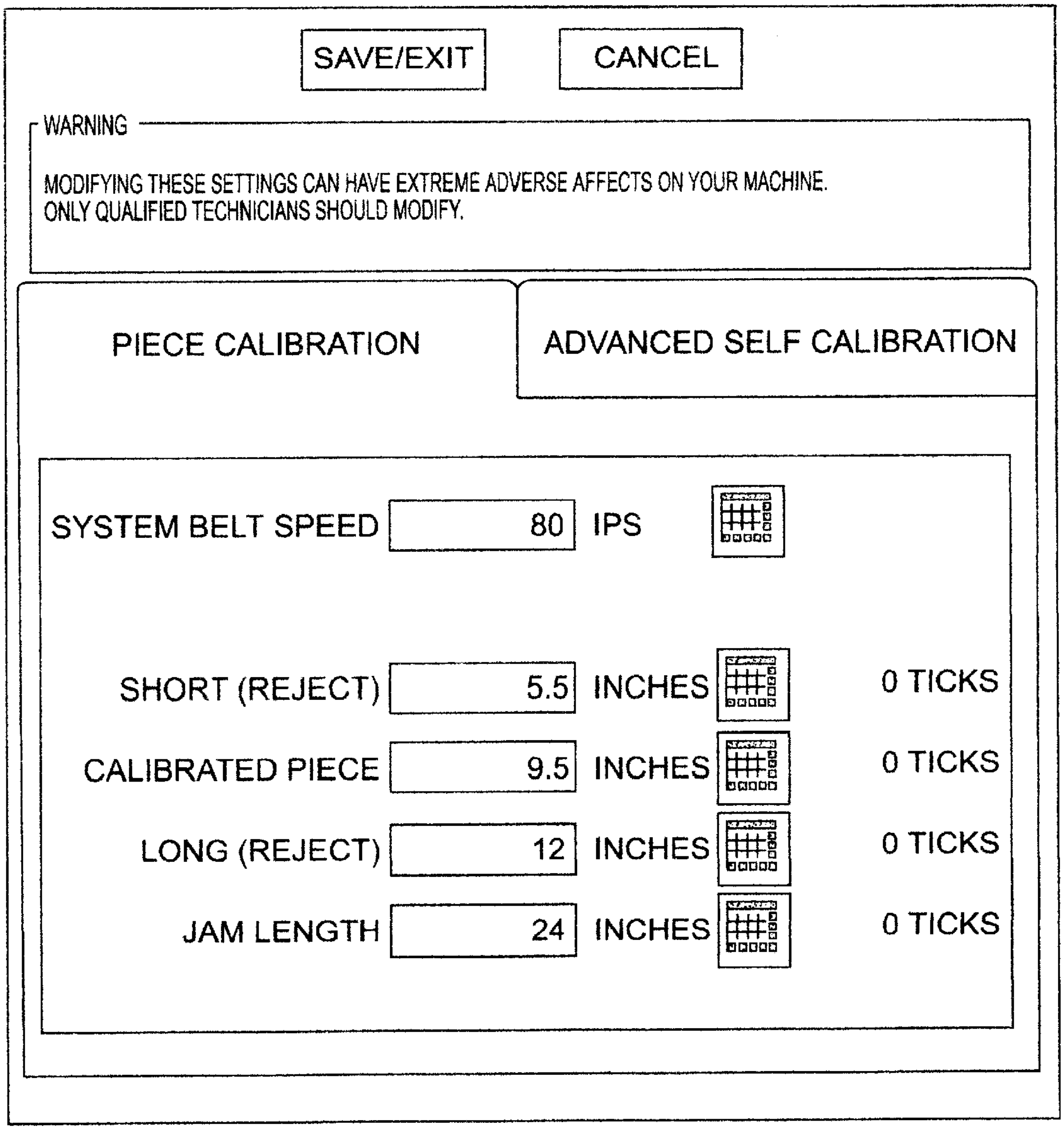
FIG. 15 shows a preferred GUI for specifying article calibration values.
Figure 16:
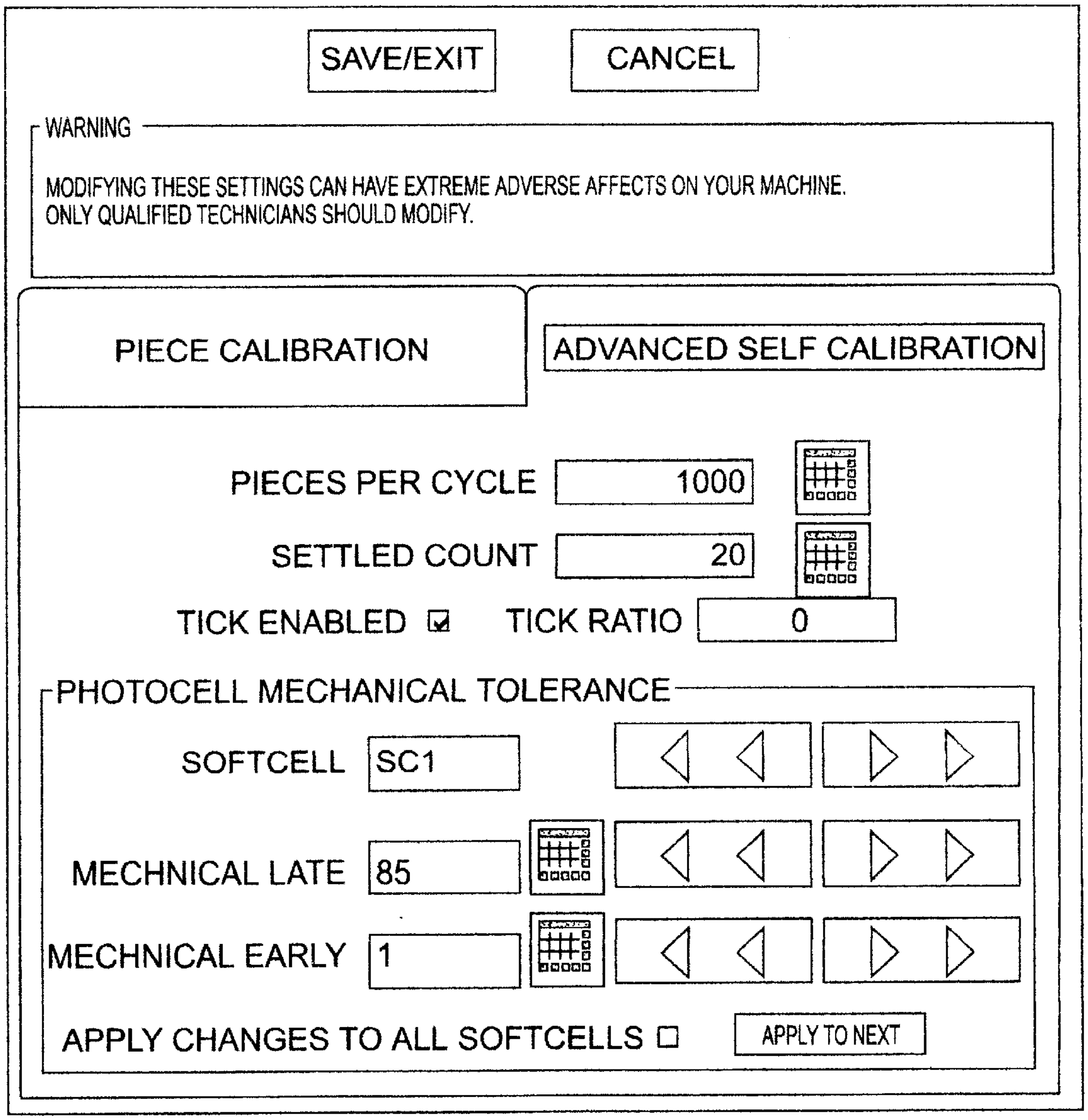
FIG. 16 shows a preferred GUI for configuring advanced self calibration.

FIG. 14 shows a GUI for monitoring tracking chain performance and initiating fast calibration and calibration of mechanical limits. The "Clr Counts" button resets the tracked piece, jam and error counters to zero. The "Drop Audit Lvl" button controls the amount and type of information generated and subsequently saved for auditing and debugging. The "Calibration" button calls a tabbed GUI for setting calibration parameters, as shown in FIGS. 15 and 16. The "Calibration Tracking Cells" and "Calibration Mech. Tolerance" switches initiate fast calibration and calibration of mechanical limits, respectively.

The five pairs of gauges shown in FIG. 14 graphically display mechanical limits and fuzzy brackets for softcells. Each softcell pair receives digital signals from a photocell at a discrete location along the transport path (e.g., TR3, TR4, TR5, TR6 and TR7). The digital signals correspond to leading and trailing edge events. The darkened portion within each gauge line represents the mechanical limits (depicted as bar 24 in FIG. 1B) for the occurrence of a leading or trailing edge event, as the case may be. The upper and lower ticks on each gauge line define the fuzzy bracket range (depicted as bar 22 in FIG. 1B) for the occurrence of a leading or trailing edge event, as the case may be. The middle tick on each gauge line defines an average value for a calibration cycle (e.g., 1000 pieces, as specified in FIG. 16).

Referring now to FIG. 15, a GUI for specifying piece calibration values is shown. While values are specified in inches and inches per second for convenience, other units of measure, such as temporal units for lengths and shaft encoder ticks for belt speed, may be used. The "System Belt Speed" defines a reference transport speed. The "Calibrated Piece" size corresponds to the length of articles used during fast calibration and sets the standard size for all length forward calculations. The "Short (Reject)" and "Long (Reject)" lengths define which articles are too long or too short. These lengths correspond to length forward short and long reject limits.

FIG. 16 shows a GUI for specifying advanced self-calibration parameters. The "Pieces Per Cycle" value defines the calibration cycle for continuous calibration. The "Settled Count" defines the number of consecutive events that all brackets must report at almost zero differences from previous events. This defines the calibration as "seftled." If differences are great from previous events on any bracket, the calibration is "unsettled." The "Mechanical Late" and "Mechanical Early" values define the mechanical limits.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. The article tracking software object which, when run on computer, provides:

means for receiving digital information from a sensor, a data message input means inputting a data message, means for selectively reporting conditions corresponding to said digital information based on signals, derived from said data message input means, means for establishing an acceptable temporal range for said digital information to be received from said sensor; and means for determining if said article tracking software object receives said digital information within said acceptable temporal range;

means for establishing a predicted temporal range for said digital information to be received from said sensor, said predicted temporal range being within said acceptable temporal range;

means for determining if said object receives said digital information, within said predicted temporal range, and means for adjusting said predicted temporal range if said object receives said digital information outside of said predicted temporal range but within said acceptable temporal range.

2. The article tracking software object according to claim 1, further including means for providing:

establishing expected digital information be received from the sensor, relative to said predicted temporal range, based on signals derived from said data message input means.

3. The article tracking software object according to claim 2, further providing means for establishing a mode of operation for said software object, said mode of operation consisting of one of the following modes:

an asynchronous mode, during which mode said software object receives all digital information from said sensor, a synchronous mode, during which mode said software object receives digital information from said sensor only when selective signal are derived from said data message input means, or a predictive mode, during which mode said software object receives digital information from said sensor only when selective signals are derived from said data message input means during said acceptable temporal range.

4. The article tracking software object according to claim 1, further providing a graphical user interface for configuring said means for receiving digital information from a sensor, said data message input means, and said means for selectively reporting conditions corresponding to said digital information based on signals derived from said data message input means.

5. An article tracking chain including a plurality of serially arranged software objects which, when run on a computer, wherein each said software object provides:

means for receiving digital information from a sensor, a message data input means, means for selectively reporting conditions corresponding to said digital information based on signals derived from said data message input means, means for establishing an acceptable temporal range for said digital information to be received from said sensor;

means for determining if said object receives said digital information within said acceptable temporal range;

means for establishing a predicted temporal range for said digital information to be received from said sensor, said predicted temporal range being within said acceptable temporal range, means for determining if said serially arranged object receives said digital information within said predicted temporal range, and means for adjusting said predicted temporal range is said object receives said digital information outside of said predicted temporal range but within said acceptable temporal range.

6. The article tracking chain according to claim 5 wherein each said software object further provides means for establishing expected digital information to be received from the sensor, relative to said predicted temporal range, based on signals derived from said data message input means.

7. The article tracking chain according to claim 6 wherein each said software object further provides means for establishing a mode of operation for each said software object, said mode of operation consisting of one of the following modes:

an asynchronous mode, during which mode said software object receives all digital information from said sensor, a synchronous mode, during which mode said software object receives digital information from said sensor only when selective signals are derived from said data message input means, or a predictive mode, during which mode said software object receives digital information from said sensor only when selective signals are derived from said data message input means during said acceptable temporal range.

8. The article tracking chain according to claim 7 wherein said plurality of serially arranged software objects further provides a first serially arranged software object and a plurality of down stream serially arranged software objects, said first serially arranged software objects, said first serially arranged software object having an established asynchronous mode of operation, and said plurality of down stream serially arranged software objects having established synchronous or predictive modes of operation.

9. The article tracking chain according to claim 5, further provides a graphical user interface for configuring each said software object.

10. A method of tracking an article traveling along a transport path using a sensor and an article tracking software object having a data message input means, said method comprising the steps of receiving digital information from said sensor, deriving signals from said data message input means, selectively reporting conditions corresponding to said digital information based on signals derived from said data message input means, establishing an acceptable temporal range for said article software object to receive said digital information from said sensor;

determining if said object receives said digital information within said acceptable temporal range;

establishing a predicted temporal range for said digital information to be received from said sensor, said predicted temporal range being within said acceptable temporal range;

determining if said article tracking software object receives digital information within said predicted temporal range; and adjusting said predicted temporal range if said article tracking software object receives said digital information outside of said predicted temporal range but within said acceptable temporal range.

11. The method of tracking an article according to claim 10, further including the step of establishing expected digital information to be received from the sensor, relative to said predicted temporal range, based on signal derived from said data message input means.

12. The method of tracking an article according to claim 11, further including the steps of establishing a mode of operation for said software object, said mode of operation consisting of one of the following modes:

an asynchronous mode, during which mode said software object receives all digital information from said sensor, a synchronous mode, during which mode said software object receives digital information from said sensor only when selective signals are derived from said data message input means, or a predictive mode, during which mode said software object receives digital information from said sensor only when selective signals are derived from said data message input means during said acceptable temporal range.

13. A method of tracking an article traveling along a transport path using an article tracking software object, said method comprising the steps of:

establishing a predicted temporal range for detecting the arrival of an edge of said article using a first means for sensing, detecting the arrival of said edge of said article using said first means for sensing, determining a temporal value corresponding to the arrival of said edge of said article using said first means for sensing, comparing said temporal value with said predicted temporal range, and selectively reporting conditions corresponding to said temporal value as compared to said predicted temporal range, establishing an acceptable temporal range for detecting the arrival of an edge of said article using said first means for sensing, said predicted temporal range being within said acceptable temporal range;

comparing said temporal value with said acceptable temporal range if said temporal range value is outside of said predicted temporal range, and selectively reporting conditions corresponding to said temporal value as compared to said acceptable temporal range if said temporal value is outside of said predicted temporal range.

14. A system for tracking an article traveling along a transport path, said system including a plurality of sensors for sensing an edge of said article as said article travels along the transport path, a plurality of serially arranged software objects, each said sensor being functionally coupled to a pair of said software objects and each said software object having means for receiving digital information from one of said sensors, said digital information corresponding to the arrival of an article edge along the transport path, a message data input means, a message data output means, means for establishing an acceptable temporal range and a predicted temporal range for said digital information to means for determining if said object receives said digital information within said acceptable temporal range and within said predicted temporal range, means for adjusting said predicted temporal range if said object receives said digital information outside of said predicted temporal range but within said acceptable temporal range, means for reporting an article identifier and conditions through said message data output means, said conditions corresponding to said digital information received in relation to said acceptable temporal range and said predicted temporal range, a graphical user interface for configuring said plurality of serially arranged software objects, and means for determining any of a plurality of conditions based on said digital information and said data message input.

15. The article tracking software object as recited in claim 1, further including means for establishing an operational mode for said software object, said operational mode being one of:

an asynchronous mode during which said software objects receives all digital information from said sensor, a synchronous mode during which said software object receives said digital information only when selective signals are derived from said data message input means, and a predictive mode during which said software object receives said digital information only during a temporal range and when selective signals are derived from said data message input means.

16. The article tracking chain as recited in claim 5, further including means for determining any of a plurality of conditions based on said digital information and said data message input.

17. The article tracking chain as recited in claim 5, further including means for establishing an operational mode for said software object, said operational mode being one of:

an asynchronous mode during which said software objects receives all digital information from said sensor, a synchronous mode during which said software object receives said digital information only when selective signals are derived from said data message input means, and a predictive mode during which said software object receives said digital information only during a temporal range and when selective signals are derived from said data message input means.

18. The method as recited in claim 10, including the further step of determining any of a plurality of conditions based on said digital information and said signals derived from said data message input means.

19. The method as recited in claim 10, further including the step of establishing an operational mode for said software object, said operational mode being one of:

an asynchronous mode during which said software objects receives all digital information from said sensor, a synchronous mode during which said software object receives said digital information only when selective signals are derived from said data message input means, and a predictive mode during which said software object receives said digital information only during a temporal range and when selective signals are derived from said data message input means.

20. The method as recited in claim 13, including the further step of determining any of a plurality of conditions based on said digital information and said predicted temporal range.

21. The method as recited in claim 13, further including the step of establishing an operational mode for said software object, said operational mode being one of:

an asynchronous mode during which said software objects receives all digital information from said sensor, a synchronous mode during which said software object receives said digital information only when selective signals are derived from said data message input means, and a predictive mode during which said software object receives said digital information only during a temporal range and when selective signals are derived from said data message input means.

22. The system as recited in claim 14, further including means for determining any of a plurality of conditions based on said digital information and said message data input.

23. The system as recited in claim 14, further including means for establishing an operational mode for said software object, said operational mode being one of:

an asynchronous mode during which said software objects receives all digital information from said sensor, a synchronous mode during which said software object receives said digital information only when selective signals are derived from said data message input means, and a predictive mode during which said software object receives said digital information only during a temporal range and when selective signals are derived from said data message input means.

24. An article tracking software object which, when run on computer, provides:

receiving digital information from a sensor, inputting a data message, selectively reporting conditions corresponding to said digital information based on signal derived from said data message input means, establishing an acceptable temporal range for said digital information to be received from said sensor, determining if said object receives said digital information within said acceptable temporal range, establishing a predicted temporal range for said digital information to be received from said sensor, said predicted temporal range being within said acceptable temporal range, determining if said object receives said digital information within said predicted temporal range, and adjusting said predicted temporal range if said object receives said digital information outside of said predicted temporal range but within said acceptable temporal range.

25. The article tracking software object according to claim 24, further providing:

establishing expected digital information be received from the sensor, relative to said predicted temporal range, based on signals derived from said data message input means.

26. The article tracking software object according to claim 25, further providing establishing a mode of operation for said software object, said mode of operation consisting of one of the following modes:

an asynchronous mode, during which mode said software object receives all digital information from said sensor, a synchronous mode, during which mode said software object receives digital information from said sensor only when selective signal are derived from said data message input, or a predictive mode, during which mode said software object receives digital information from said sensor only when selective signals are derived from said data message input during said acceptable temporal range.

27. The article tracking software object according to claim 24, further providing configuring with a graphical user interface said receiving digital information from a sensor, said data message inputting, and said selectively reporting conditions corresponding to said digital information based on signals derived from said data message input means.

* * * * *